United States Patent [19]

Nagano et al.

[11] Patent Number: 5,042,021

[45] Date of Patent: Aug. 20, 1991

[54] ECCENTRICITY CORRECTION APPARATUS FOR AN OPTICAL DISC DEVICE

[75] Inventors: Katsumi Nagano; Hiroshi Watanabe, both of Tokyo, Japan

[73] Assignee: Kabushiki Kaisha Toshiba, Kanagawa, Japan

[21] Appl. No.: 497,738

[22] Filed: Mar. 19, 1990

Related U.S. Application Data

[63] Continuation of Ser. No. 404,464, Sep. 7, 1989, abandoned, which is a continuation of Ser. No. 942,706, Dec. 17, 1986, abandoned.

[30] Foreign Application Priority Data

Dec. 18, 1985 [JP] Japan .................................. 60-282764
Feb. 14, 1986 [JP] Japan .................................. 61-29078
Feb. 27, 1986 [JP] Japan .................................. 61-40179

[51] Int. Cl.$^5$ ............................................. G11B 7/095
[52] U.S. Cl. .................................. 369/44.32; 369/58; 360/77.04
[58] Field of Search .................... 358/342; 369/32, 54, 369/58, 44.26, 44.32; 360/77.02, 77.04

[56] References Cited

U.S. PATENT DOCUMENTS

| 3,085,230 | 4/1963 | Shoultes et al. ........................ 360/78 |
| 4,138,741 | 2/1979 | Hedlund et al. . |
| 4,321,700 | 3/1982 | Russell ..................................... 369/44 |
| 4,365,324 | 12/1982 | Michaelis . |
| 4,527,263 | 7/1985 | Nakagawa ............................... 369/46 |
| 4,695,989 | 9/1987 | Kimoto ..................................... 369/32 |
| 4,775,966 | 10/1988 | Miura et al. ............................. 369/44 |

FOREIGN PATENT DOCUMENTS

| 23767 | 2/1981 | European Pat. Off. ............... 369/43 |
| 0076347 | 4/1983 | European Pat. Off. . |
| 0138275 | 4/1985 | European Pat. Off. . |
| 0139332 | 5/1985 | European Pat. Off. . |
| 0162702 | 11/1985 | European Pat. Off. . |
| 56-7247 | 1/1981 | Japan ...................................... 369/43 |
| 57-212666 | 12/1982 | Japan ...................................... 369/43 |
| 2085192 | 4/1982 | United Kingdom ................... 369/46 |

Primary Examiner—Robert L. Richardson
Attorney, Agent, or Firm—Finnegan, Henderson, Farabow, Garrett, and Dunner

[57] ABSTRACT

An optical disc apparatus includes a tracking device which positions the beam light on the recording track of an optical disc in order to carry out at least recording or reproducing of information by moving the beam light in the radial direction of the optical disc, and a detection device for obtaining a position deviation signal of the beam light by receiving reflected light from the surface of the optical disc. In addition, the apparatus includes an optical head which carries out recording or reproducing of information for the recording track of the optical disc, a control device which controls the tracking device in response to the position deviation signal obtained from the detection device, a first device which reads, prior to an actual operation of recording or reproducing, a position deviation signal from the detection device, and stores the resulting data in a memory as eccentricity correction data for the recording track, and a second device which transfers, when actually carrying out recording or reproducing operation, the eccentricity correction data memorized in the memory to the D/A converter and gives the output of the D/A converter to the tracking control device. The D/A converter converts the digital quantity read from the memory to an analog signal, and the analog signal may be applied to a device for driving the optical head.

16 Claims, 23 Drawing Sheets

DISTANCE IN DIAMETRICAL DIRECTION

FIG. 19

| ΔVin | C4 C3 C2 C1 | A4 A3 A2 A1 | B14 B13 B12 B11 |
|---|---|---|---|
| 8Vr < ΔVin | 1 1 1 1 | 1 0 0 0 | 1 0 0 0 |
| 4Vr < ΔVin < 8Vr | 0 1 1 1 | 0 1 0 0 | 0 1 0 0 |
| 2Vr < ΔVin < 4Vr | 0 0 1 1 | 0 0 1 0 | 0 0 1 0 |
| Vr < ΔVin < 2Vr | 0 0 0 1 | 0 0 0 1 | 0 0 0 1 |
| ΔVin < Vr | 0 0 0 0 | 0 0 0 0 | 0 0 0 0 |

| ΔVin | C4 C3 C2 C1 | S4 S3 S2 S1 | B14 B13 B12 B11 |
|---|---|---|---|
| -Vr < ΔVin | 0 0 0 0 | 0 0 0 0 | 0 0 0 0 |
| -2Vr < ΔVin < -Vr | 0 0 0 1 | 1 1 1 1 | 1 1 1 1 |
| -4Vr < ΔVin < -2Vr | 0 0 1 1 | 1 1 1 0 | 1 1 1 0 |
| -8Vr < ΔVin < -4Vr | 0 1 1 1 | 1 1 0 0 | 1 1 0 0 |
| ΔVin < -8Vr | 1 1 1 1 | 1 0 0 0 | 1 0 0 0 |

| INPUTS | | | OUT PUTS | |
|---|---|---|---|---|
| $B_n$ | $A_n$ | $C_n$ | $\Sigma_n$ | $C_n$ |
| L | L | L | L | L |
| L | L | H | H | L |
| L | H | L | H | L |
| L | H | H | L | H |
| H | L | L | H | L |
| H | L | H | L | H |
| H | H | L | L | H |
| H | H | H | H | H |

| ΔVin | B'(1) |||||||| 
|---|---|---|---|---|---|---|---|---|
| | $B_{18}$ | $B_{17}$ | $B_{16}$ | $B_{15}$ | $B_{14}$ | $B_{13}$ | $B_{12}$ | $B_{11}$ |
| 8Vr < ΔVin | 0 | 0 | 0 | 0 | 1 | 0 | 0 | 0 |
| 4Vr < ΔVin < 8Vr | 0 | 0 | 0 | 0 | 0 | 1 | 0 | 0 |
| 2Vr < ΔVin < 4Vr | 0 | 0 | 0 | 0 | 0 | 0 | 1 | 0 |
| 1Vr < ΔVin < 2Vr | 0 | 0 | 0 | 0 | 0 | 0 | 0 | 1 |
| -1Vr < ΔVin < 1Vr | 0 | 0 | 0 | 0 | 0 | 0 | 0 | 0 |
| -2Vr < ΔVin < -1Vr | 1 | 1 | 1 | 1 | 1 | 1 | 1 | 1 |
| -4Vr < ΔVin < -2Vr | 1 | 1 | 1 | 1 | 1 | 1 | 1 | 0 |
| -8Vr < ΔVin < -4Vr | 1 | 1 | 1 | 1 | 1 | 1 | 0 | 0 |
| ΔVin < -8Vr | 1 | 1 | 1 | 1 | 1 | 0 | 0 | 0 |

ECCENTRICITY CORRECTION APPARATUS FOR AN OPTICAL DISC DEVICE

This application is a continuation of application Ser. No. 07/404,464, filed Sept. 7, 1989, which is a continuation of application Ser. No. 06/942,706, filed Dec. 17, 1986 both now abandoned.

BACKGROUND OF THE INVENTION

1. Field of the Invention

The present invention relates to an optical disc apparatus which carries out recording or reproducing of information by the tracking of an optical head with respect to a rotating optical disc and, more particularly, to an eccentricity correction apparatus for offsetting the adverse effects of eccentricity in the tracks of the optical disc.

2. Description of the Prior Art

In general, in an optical disc apparatus of the above kind, the optical disc has concentric circular or spiral recording tracks as the information recording medium, and the recording or reproducing of information for the recording track of the optical disc is carried out by linearly moving the recording head in the radial direction of the optical disc while rotating the disc.

In such an optical disc apparatus, the optical head must precisely follow the recording tracks of the rotating disc. For this reason, tracking control is ordinarily carried out using a tracking servo system.

In the optical disc apparatus of the above description, when the optical head is moved from an arbitrary recording track which is in rotation to another recording track, tracking is interrupted for a while to move the optical head for a distance which corresponds to the separation between the present and desired tracks, and tracking is then resumed. However, the recording tracks themselves of the optical disc are generally not necessarily concentric with respect to the center of the rotation shaft of the motor that drives to rotate the optical disc, and are often eccentric. Because of this, when tracking is interrupted once, the relative position of the optical head with respect to the recording track has a dispersion that corresponds to the eccentricity amount so that, when tracking is resumed after the head has been moved, it leads to a drawback that accuracy tends to be lowered by the deviation corresponding to the dispersion. This results in difficulty in reducing the time for positioning the optical head to the desired track.

Further, in the optical disc 1 as shown in FIG. 1, a spiral pre-groove 2 is provided on the surface of the substrate for tracking, in order to facilitate recording and reproducing. Since the recording track is provided in the pre-groove 2, the pre-groove 2 is referred to simply as the track hereinafter.

In FIG. 1, for facilitating understanding, the track pitch is drawn schematically with wide separation. However, the real track is formed with a relatively small pitch on the order of microns ($\mu$m).

The optical disc 1 is placed on a spindle motor, as will be described later, to be rotated in the direction of the arrow R of FIG. 1. Accompanying the rotation, the beam spot (laser spot) of the optical beam projected from the optical head is traced on the track 2. The beam spot is shifted outward by one track for each one rotation of the optical disc 1.

Recording of information is made by the change in reflectivity generated by the phase transition or the like in a thin film layer in the track portion of the disc, through irradiation of the beam spot whose intensity is modulated by an information signal.

FIG. 2 shows a track control device for causing the optical head 4 to follow the track 2 in recording and reproducing information from the optical disc 1 as described above. In FIG. 2, a light source is omitted to simplify the track control device.

In the optical head 4, reference numeral 5 is an objective lens which projects the beam spot of the light beam on the optical disc 1; 6 is a driving coil for controlling the position of the objective lens 5 in the radial direction of the optical disc 1; 13a and 13b are photodetectors for detecting the intensities of reflected light rays 11 and 12, respectively, photodetector 13a being connected to the negative input terminal of a differential amplifier 15 via a sensor amplifier 14a while photodetector 13b is connected to the positive input terminal of the differential amplifier 15 via another sensor amplifier 14b.

It should be noted that an optical system is provided for projecting a beam from the laser diode as will be described later. However, for the sake of convenience of explanation, the beam incidence optical system is omitted in FIG. 2 and the configuration of the reflection optical system is principally illustrated.

If the beam spot is projected correctly on the pre-groove 2 as shown in the figure and tracking is carried out precisely, then the intensities of both reflected lights 11 and 12 become equal and the track difference signal voltage TS output from the differential amplifier 15 becomes zero.

If the beam spot is shifted toward the center of the optical disc 1 as shown by the arrow in FIG. 2, the reflected light ray 11 is reflected from the surface portion of the disc (the area outside the pre-groove 2) with greater intensity, giving a larger detected value at the photodetector 13a, and causing the differential amplifier 15 to output a negative track deviation signal voltage $-TS$.

If the beam spot is shifted in the direction opposite the arrow in FIG. 2, the reflected light ray 12 has a greater intensity but opposite to the above, and a positive track deviation signal voltage $+TS$ is output from the differential amplifier.

The track control is carried out by applying the positive and negative track deviation signal voltages $\pm TS$ to the driving coil 6 and controlling the position of the objective 5 to drive the track difference signal voltage TS to zero. By applying the tracking servo to make the track deviation signal voltage TS zero, the beam spot follows the track 2 to carry out correct recording and reproducing.

The optical disc apparatus can carry out the operation of repeatedly reproducing an identical track of one turn, the so-called track-on mode, in addition to the ordinary operation of recording and reproducing as described above. The track-on mode operation can be realized by applying a jump pulse to the driving coil 6 each time the optical disc 1 completes one rotation, to cause the beam spot to jump to the adjacent previous track. In carrying out the track jump, the loop of the tracking servo is open.

The solid waveform in FIG. 3 is the output waveform of the track deviation signal voltage TS when a track jump is carried out by passing a current in the driving coil in the direction of the arrow in FIG. 2, and the broken-line waveform is the output waveform for the track deviation signal voltage TS when the track jump is carried our in the opposite direction.

The track deviation signal voltage TS is output as a waveform for one cycle every time the optical head 2 traverses the pre-groove 2. Therefore, the number of waves in the track deviation signal voltage TS corresponds to the number of tracks jumped.

When the optical disc 1 is mounted on the spindle motor, the central point Cp1 of the optical disc 1 and the center Cp2 of the rotation shaft of the spindle motor typically do not coincide perfectly, producing eccentricity for the optical disc 1 as shown in FIG. 4. This can be due to the accuracy of the center hole of the optical disc 1, errors generated in chucking the disc to the spindle motor, and so on.

To illustrate the situation schematically, let us approximate the track by concentric circles 2a and 2b as shown in FIG. 4. If one assume that the optical disc 1 is rotated in the direction of arrow R and the beam spot from the optical head 4 is projected on a fixed position, then the locus of the beam spot will be a dotted circle which has the rotation center Cp2 of the spindle motor as the center. Thus, for the track 2a, the beam spot coincides with the track 2a at points a and c, but deviates by the amount of eccentricity at points b and d, i.e., it is shifted to the outside of the track 2a at point b while it is shifted to the inside of the track 2a at point d.

FIG. 5 shows the waveform of the track difference signal voltage TS on which each of the points a, b, c and d is indicated.

If the tracking servo is activated, the track deviation signal voltage TS is applied to the driving coil 6, and the beam spot is corrected to follow the track 2 so as to be moved to the inside at point b and to the outside at point d.

As in the above, even if the optical disc 1 is placed on the spindle motor with eccentricity relative to the rotating center of the motor, when the tracking servo is turned on, the beam spot can be made to follow the track 2 correctly. However, when a track jump is carried out, the loop of the tracking servo is brought to an open state. Because of this, when the beam spot which has been following the track 2a is jumped, for example, to the track 2b, the beam spot deviates from the track 2a in the vicinities of the points b and d. Therefore, a problem arises in making a jump from the track 2a to the track 2b in that the track jumping is unstable by the variations in the jumping distance in the vicinities of the point b and the point d.

A successive comparison type A/D converter is known for use as an A/D converter in the prior art optical disc apparatus which carries out high precision A/D conversion. The A/D converter has a voltage comparison circuit, a successive comparison register, a D/A converter that constitutes the feedback circuit, a clock oscillator which carries out the overall control, and so on.

With this converter, a digital quantity which corresponds to the input analog voltage is arranged to be output in the following way. Starting with the least significant bit of the successive comparison register, a converted voltage that corresponds to each bit is arranged to be output from the D/A converter to compare the converted voltage with the input analog voltage in the voltage comparison circuit. If these two voltages do not coincide, the same procedure is successively repeated for each bit until agreement is obtained.

However, in the successive comparison type A/D converter as noted above, an analog voltage is converted to a digital quantity by the successive comparison of the smallest bit unit. This type of device has generally been unsatisfactory because of the inability for high speed operation due to a relatively long time required to obtain the digital quantity.

A parallel comparison type A/D converter is also known as an existing A/D converter which can carry out A/D conversion at high speed. The A/D converter comprises a resistor ladder circuit which generates $(2^n - 1)$ reference voltages by subdividing a given voltage into $2^n$ equal parts when the digital quantity to be output has n bits, $(2^n - 1)$ voltage comparators to each of their reference terminals for setting each of the reference voltages generated in the resistor ladder circuit, and a decoder which transmits the outputs of the voltage comparators as an n-bit digital quantity after binary coding conversion.

With this construction, an input analog voltage is input parallel to the input terminals of all of the voltage comparators and compared at once with all of the reference voltages, to output from the decoder a digital quantity that corresponds to the input analog voltage.

However, in the parallel comparison type A/D converter described above, a large number $(2^n - 1)$ of voltage comparators are required for the digital quantity of n bits. Because of this, factors for accuracy deterioration such as the dispersion in the threshold voltage, input bias current, input offset voltage, and delay time, for each of the voltage comparators, and the relative accuracy of the resistor ladder circuit, are augmented, giving rise to difficulty in achieving a high accuracy A/D conversion.

SUMMARY OF THE INVENTION

An object of the present invention, in view of the above circumstances, is to provide an optical disc apparatus which enables the optical head to precisely follow the recording track on the optical disc by minimizing the amount of eccentricity between the optical head and the optical disc.

Another object of the present invention is to provide an eccentricity correction device in the optical disc apparatus which enables a precise track jump.

Still another object of the present invention is to provide an A/D converter which can carry out high accuracy A/D conversion at high speed.

In order to achieve the above objects, an optical disc apparatus in the present invention reads via an A/D converter the position deviation of tracking output from an optical head, prior to the actual operation of recording or reproducing, and stores it as eccentricity correction data after giving a predetermined data processing. In an actual recording or reproducing operation, the eccentricity correction data that has been stored is transferred to a D/A converter, and the amount of eccentricity between the optical head and the optical disc is minimized by giving the output of the D/A converter to a tracking control means.

Further the optical disc apparatus of the present invention comprises a track deviation signal circuit which detects the amount and direction of deviation of the beam spot for recording or reproducing projected for each position on the recording track, and generates a track deviation signal voltage whose absolute value is proportional to the amount of deviation and is positive or negative in response to the direction of the deviation, a memory which stores a digital quantity, a voltage comparison circuit for setting positive and negative predetermined reference voltages, and compares the reference voltages with the track deviation signal voltage, an adder which adds or subtracts digital data based on the output of the voltage comparison circuit from the digital quantity read from the memory, causes the memory to store a new digital quantity obtained after the addition or subtraction operation, and repeats the addition or subtraction operation until the absolute value of the track deviation signal voltage becomes smaller than the value of the reference voltage, and a D/A converter which converts the digital quantity read from the memory into an analog voltage, and applies the analog voltage to means for driving the optical head.

Moreover, in the present invention, in the voltage comparison circuit, a plurality of positive and negative reference voltages related to the weighting of each bit are set, and by generating an analog voltage proportional to an interim digital quantity stored in the memory in the D/A converter, the difference voltage between the input analog voltage and the generated analog voltage is simultaneously compared with the plurality of reference voltages in the voltage comparison circuit. Based on the output from the voltage comparison circuit, a binary number weighted corresponding to the absolute value of the difference voltage, in response to the positive or negative sign of the difference voltage, is added or subtracted by the adder from the digital quantity read from the memory. The new digital quantity obtained in this way as the result of the arithmetic operation is stored in the memory, and the above operation is repeated until the absolute value of the difference voltage becomes smaller than the reference voltage that corresponds to the weighting for the least significant bit. In this manner, high accuracy A/D conversion is accomplished at high speed.

BRIEF DESCRIPTION OF THE DRAWINGS

These and other objects, features and advantages of the present invention will be more apparent from the following description of the preferred embodiments taken in conjunction with the accompanying drawings in which:

FIG. 19 is a diagram showing the addition and subtraction data set in the addition-subtraction data set circuit in FIGS. 15 and 18;

DESCRIPTION OF THE PREFERRED EMBODIMENTS

An optical disc apparatus according to the present invention will now be described with reference to the drawings.

Figure 6:
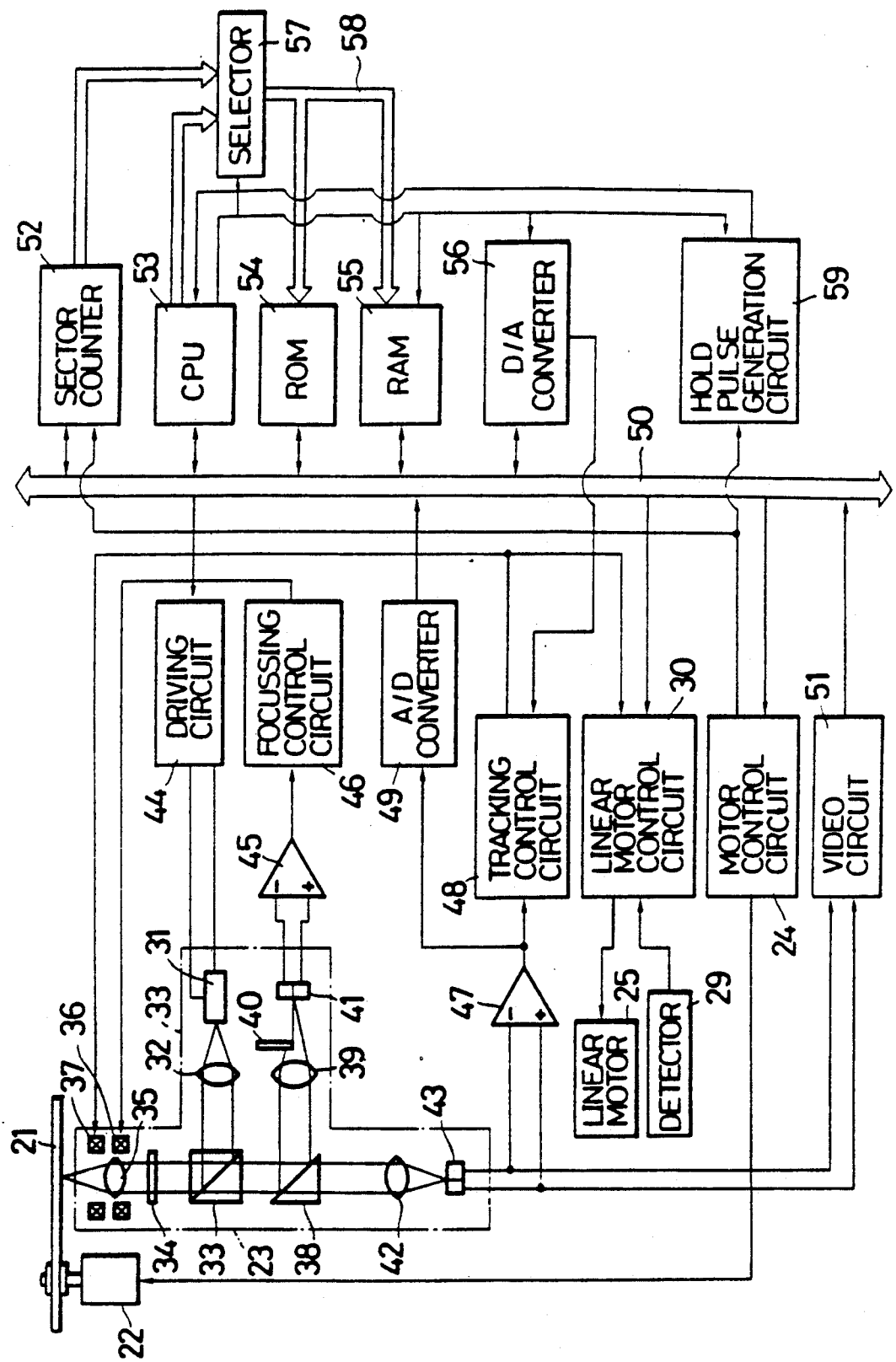
FIG. 6 is an overall block diagram of an optical disc apparatus in accordance with the present invention.
Figure 8:
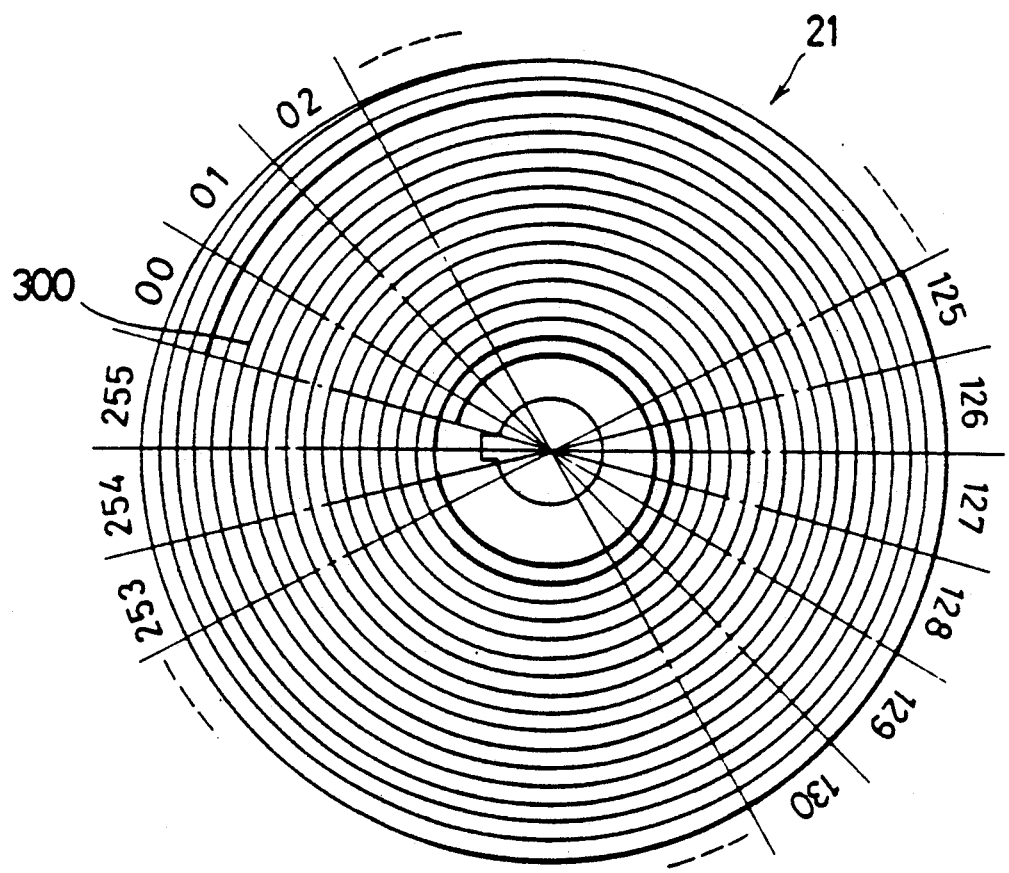
FIG. 8 is a diagram showing an optical disc which is subdivided into 256 sectors in the circumferential direction.

In FIG. 6, 21 is an optical disc, 22 is a driving motor for rotating the optical disc 21, and 23 is an optical head for recording and reproducing data. The optical disc 21 has a concentric circular or spiral recording track 300, as shown in FIG. 8, and one rotation of the optical disc is subdivided into 256 sectors of "0 to 255" for data storage. The motor 22 is driven by a motor control circuit 24.

A laser oscillator 31 is used as a laser beam light generating means, and an objective 35 concentrates a beam of light on the optical disc 21 and positions the beam of light on the recording track. A vertical driving coil 36 moves the objective 35 in the vertical direction, the direction of the optical axis, and a radial driving coil 37 as a tracking means moves the objective lens 35 in the radial direction, the direction orthogonal to the optical axis of the optical disc 21. Split beam detectors 41 and 43 carry out photoelectric conversion by receiving reflected light from the optical disc 21.

The laser oscillator 31 generates laser beam light by oscillation driven by a driving circuit 44. In this case, when information is recorded on the recording track of the optical disc 21, the laser oscillator 31 generates laser beam light whose intensity is modulated in response to the information to be recorded, and when information is reproduced from the recording track, the laser oscillator 31 generates laser beam light which has a constant intensity. The beam light from the laser oscillator 31 is led, after being made into parallel beams of light by a collimator lens 32, to a polarized light beam splitter 33 where it is reflected on the side of the optical disc 21. The reflected light beam is led to the objective 35 through a quarter-wavelength plate 34, and is irradiated on the recording track of the optical disc 21 after being made into a spot-like light beam by the focusing of the objective 35. The reflected light from the optical disc 21 is led through the objective 35, the quarter-wavelength plate 34, and the polarized light beam splitter 33 to a half prism 38 where it is split into two beams of light. One of the split reflected beams is focused through a condenser 39 and a knife edge 40 on the light-receiving surface of the light detector 41 where it is photoelectrically converted. Each of the output signals of the light detector 41 is used for focusing control. The other of the slit reflected beams is focused through a condenser 42 on the light-receiving surface of the light detector 43 where it is photoelectrically converted. Each of the output signals of the light detector 43 is used for tracking control and for reading of recorded information as described later.

Each of the output signals of the light detector 41 is supplied to a differential amplifier 45 from whose output is obtained a focus deviation signal of the beam light on the optical disc 21. The focus deviation signal output from the differential amplifier 45 is supplied to a focusing control circuit 46. In response to the input focus deviation signal, the focusing control circuit 46 controls the driving coil 36 for the vertical direction, and carries out focusing control by driving the objective 35 in the vertical direction to position it is so that the light beam that irradiates the optical disc 21 is correctly focused all the time.

Each of the output signals of the light detector 43 is supplied respectively to a differential amplifier 47 whose output is arranged to give a tracking position deviation signal. The tracking position deviation signal output of the differential amplifier 47 is supplied respectively to a tracking control circuit 48 as a tracking control means and an A/D converter 49. In response to the input tracking position deviation signal, the tracking control circuit 48 controls the driving coil for radial direction 37, and carries out tracking control to position the beam light on the recording track all the time so that the light beam precisely follows the recording track, by driving the objective 35 in the radial direction of the optical disc 21. It is to be noted that when the tracking is in progress, the servo mechanism is on for not only the objective 35 but also the linear motor control circuit 30 to determine the positioning of the light beam by the use of the objective 35 and the linear motor 25. The A/D converter 49 outputs the input tracking position deviation signal to a data bus 50 by converting it into a digital signal.

Further, each output signal of the light detector 43 is supplied respectively to a video circuit 51. The video circuit 51 generates a reproduced signal of recorded information, namely, a video signal reflecting bits within the recording track, by adding each output signal of the light detector 43, and outputs the video signal by binary coding it to the data bus 50 as reading information.

The driving circuit 44, the linear motor control circuit 30, and the motor control circuit 24 are connected to the data bus 50. Also connected to the data bus 50 are a sector counter 52, a CPU 53 which governs the overall control, a ROM 54 for storing the operating program of the CPU and the like, a RAM 55 as a memory means for storing the eccentricity correction data, and a D/A converter 56. The sector counter 52 is actuated by the 256 sector pulses per rotation of the optical disc 21 generated from the motor control circuit 24. A counter simply counts "from 0 to 255," and the counted value is output to the data bus 50 and is supplied to one of the input terminals of the selector 57 as an address signal of the RAM 55. The selector 57 operates switching by a hold acknowledge signal from the CPU 53, and its output terminal is connected to the ROM 54 and the RAM 55 via an address bus 58. When a hold pulse is input from a hold pulse generation circuit 59, the CPU 53 is placed in a hold state and generates a hold acknowledge signal which indicates that it is in this hold state. The hold acknowledge signal is supplied to the selector 57, RAM 55, D/A converted 56, and hold pulse generation circuit 59. The D/A converter 56 converts the data transferred from the RAM 55 to an analog signal, and supplies the converted output to the tracking control circuit 48 and the linear motor control circuit 30 as a bias. The hold pulse generation circuit 59 is a latch circuit which is set by the rising of a sector pulse generated from the motor control circuit 24 and reset by the hold acknowledge signal, and generates a hold pulse which assumes a high level and a low level in response to the set and reset signals, respectively.

In the apparatus having the construction mentioned above, first, a course access for moving the beam spot is gained by reading position information recorded in advance in the recording track of the optical disc 21 and moving the optical head 23 by the linear motor 25 to the vicinity of the target recording track. Then, by carrying out a precision access using the objective 35, it is possible to move the light beam to the desired recording track. These operations are carried out under the control of the CPU 53. Since such an access operation is already well known, further explanation will be omitted.

Next, eccentricity correction of the tracking according to the present invention will be described. First prior to an actual recording or reproducing operation, the optical disc 21 is rotated by the motor 22, and the focusing operation takes place at an arbitrary position on the optical disc 21. In this state, for each sector indicated by the counted value of the sector counter 52, the CPU 53 reads, via the data bus 50, the output of the A/D counter 49 carrying out A/D conversion of the tracking position deviation signal obtained from the output of the differential amplifier 47. After predetermined data processing of the output of the A/D converter 49, it is stored in the RAM 55 as eccentricity correction data. Here, the predetermined data processing carried out in the CPU 53 consists, for example, of temporarily storing the data read corresponding to a plural number of rotations of the optical disc 21, reading the data, taking the average for each sector, and storing the result again in the RAM 55 as eccentricity correction data. In doing so, a plurality of eccentricity correction data is prepared corresponding to the positions of the optical head 23 for the radial direction of the optical disc 21, for instance, the inner periphery position, an intermediate position, and the outer periphery position.

When the eccentricity correction data is obtained in this manner, in the actual operation of recording and reproducing of information, eccentricity correction is carried out by successively reading the eccentricity correction data corresponding to each sector from the RAM 55. Namely, the eccentricity correction process is started by actuating the hold pulse generation circuit 59. The hold pulse generation circuit 59 generates a hold pulse every time the sector is switched, and the CPU 53 is held by the hold pulse. The CPU 53 generates a hold acknowledge signal every time it is held with the hold pulse. By switching the selector 57 by a hold acknowledge signal, the output of the address bus 58 is switched from the CPU 53 to the sector counter 52. At the same time, by enabling the output of the RAM 55 and the input of the D/A converter 56 with the hold acknowledge signal, data in the RAM 55 is transferred to the D/A converter 56 while the CPU 53 is being held. This operation is repeated every time the sector is switched. The address of the RAM 55 is designated by the sector counter 52, and by this relationship a sector and an address are in correspondence all the time. In this case, eccentricity correction data prepared in plural in the RAM 55 corresponding to the positions of the optical head 23 for the optical disc 21 are switched and transferred. In addition, considering the response delay of the tracking control circuit 48, control is carried out in this case to transfer the eccentricity correction data to the D/A connector 56 by shifting the timing to one earlier than that for the target sector. The output of the D/A converter 56 is sent to the tracking control circuit 48 and is used as a bias for the driving signal of the driving coil for radial direction coil 37. In this way, it is possible to sharply reduce the apparent eccentricity.

With eccentricity correction as described above, it is possible to reduce the apparent eccentricity between the optical head 23 and the optical disc 21, and the light beam from the optical head 23 can be made to follow the recording track precisely. In addition, it becomes easy to move the optical head 23 to an arbitrary recording track. In particular, by averaging the data for a plural number of rotations of the optical disc 21, it is possible to avoid reading errors of the A/D converter 49, or the like. Moreover, by switching the eccentricity correction data in response to the position of the optical head 23 relative to the optical disc 21, it is possible for the optical head 23 to precisely follow the recording track even for a delicate difference in eccentricity of the position in the radial direction of the optical disc 21. Further, eccentricity correction data are output by considering the response delay in the tracking control circuit 48 so that it is possible to precisely follow the actual eccentricity in the optical disc 21.

It is to be noted that the reading of the tracking position deviation signal and the execution of the predetermined data processing by the CPU 53 are not limited to the embodiments given above. Thus, for example, the apparatus may be arranged to read the output of the A/D converter 49 multiple times for each sector, storing these data temporarily in the RAM 55, and take the average of the plurality of data by reading the data for each sector, and store the result in the RAM 55 as the eccentricity correction data. By taking the average of a plurality of data within one sector, it is possible to obtain a value for each sector close to the true eccentricity amount, and to improve the data linkage with the preceding and succeeding sectors.

Moreover, the predetermined data processing carried out by the CPU 53 is not limited to the embodiments described above. For instance, the apparatus may be arranged to temporarily store data in the RAM 55 for one rotation of the optical disc 21, read these data and remove the bias component due to inclination and the like of the optical head 23 from the data, and store them in the RAM 55 as the eccentricity correction data. In this manner, by removing the bias component due to inclination or the like of the optical head 23, it is possible to follow the eccentricity of the optical disc 21 at the most stable position of the optical head 23.

As described in detail in the foregoing, according to the present invention, it is possible to provide an optical disc apparatus which can reduce the apparent eccentricity between the optical head and the optical disc, and permit the optical head to precisely follow the recording track on the optical disc.

Next, the principle of the eccentricity correction device in the optical disc apparatus in accordance with another embodiment of the present invention will be described.

Figure 1:
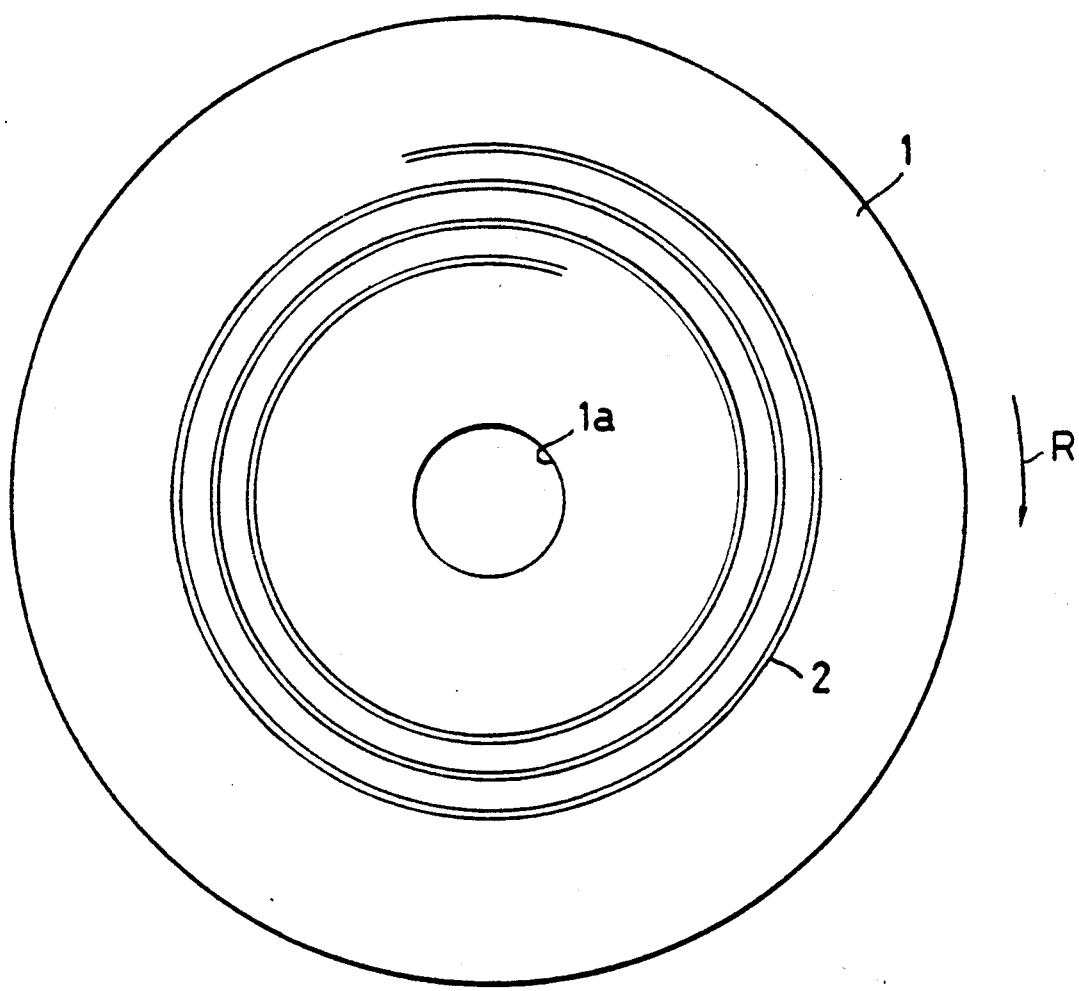
FIG. 1 is a plan view showing an optical disc.
Figure 2:
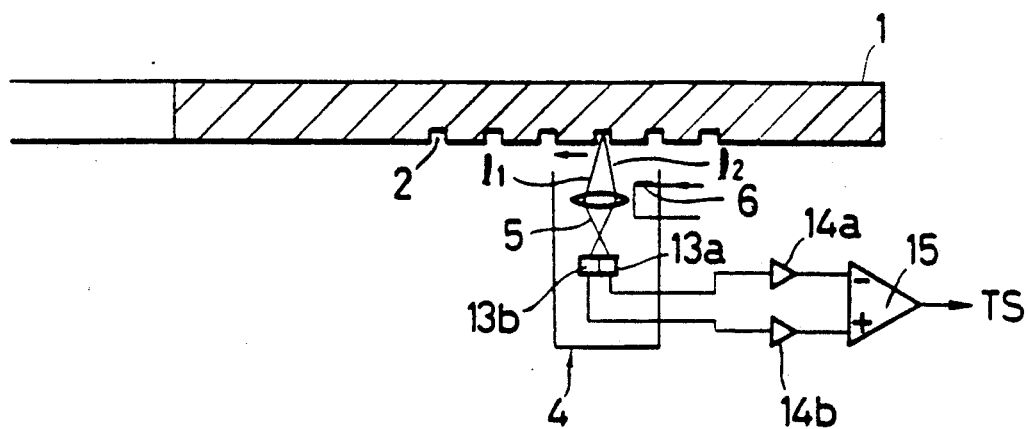
FIG. 2 is a side view with partially sectional view which shows a prior-art optical disc and optical detection system.
Figure 3:
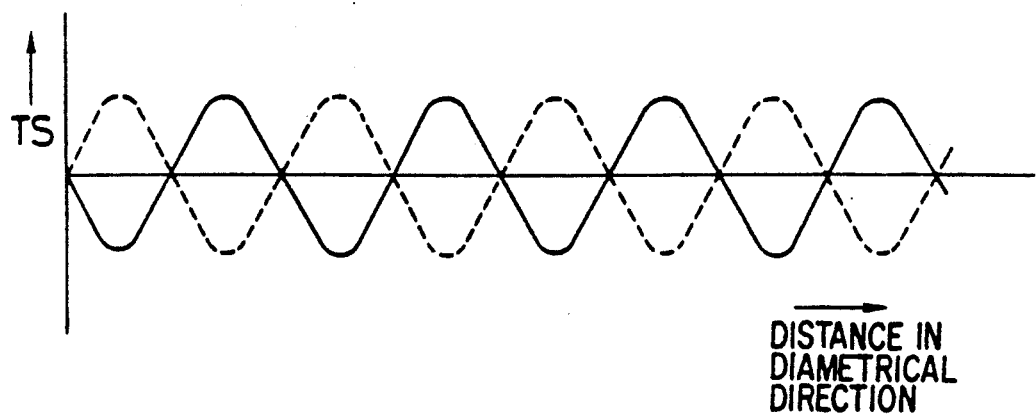
FIG. 3 is a waveform diagram that shows the output waveforms of the track deviation signal voltage in the above optical disc apparatus of FIG. 2.
Figure 4:
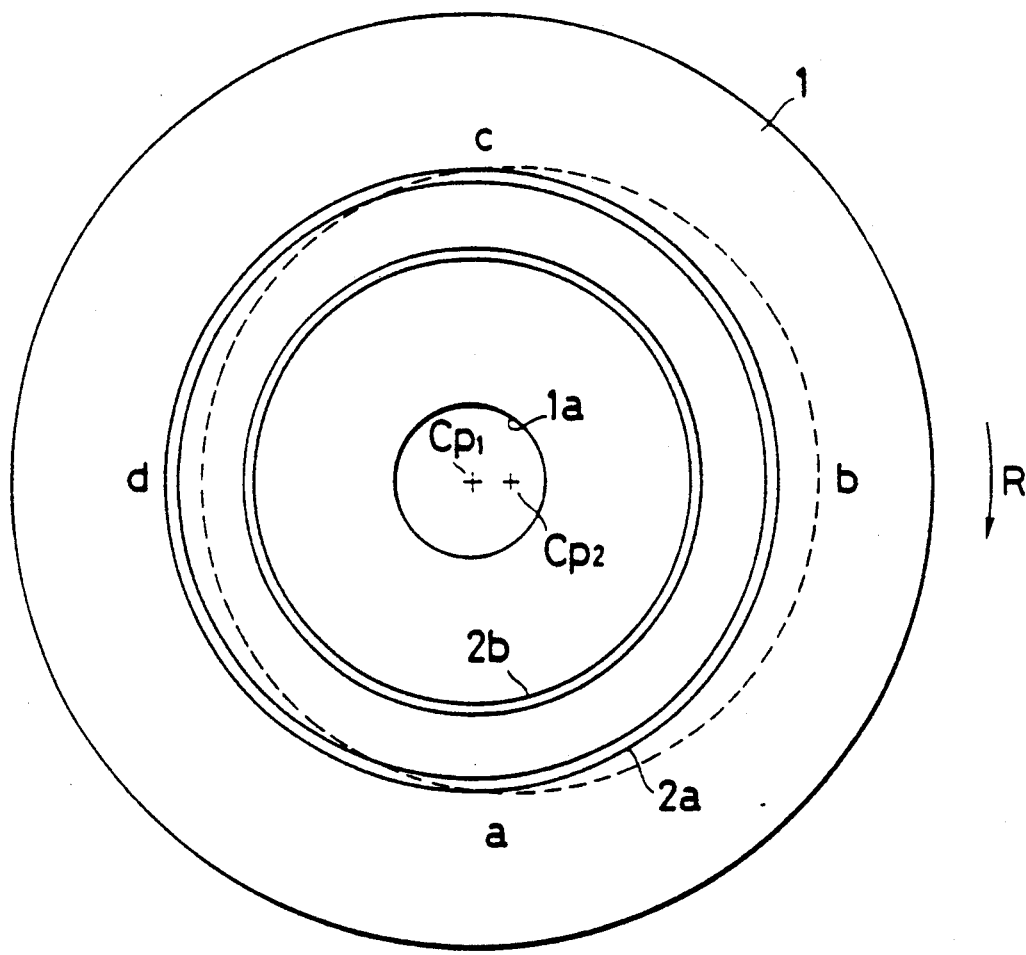
FIG. 4 is a plan view showing track eccentricity for a prior art optical disc apparatus such as the one of FIG. 1.
Figure 5:
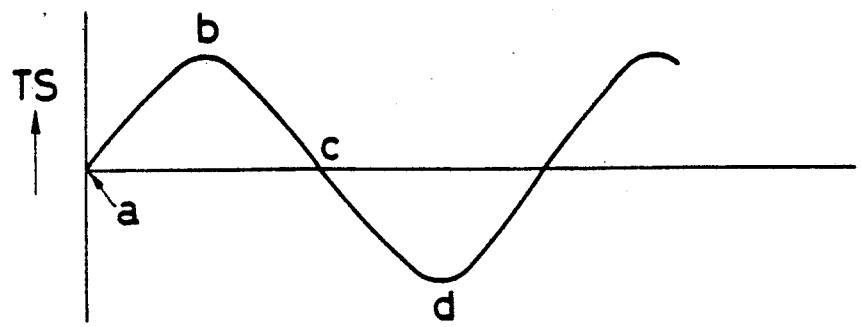
FIG. 5 is a waveform diagram which shows the output waveform of the track deviation signal voltage in the eccentricity state.
Figure 7:
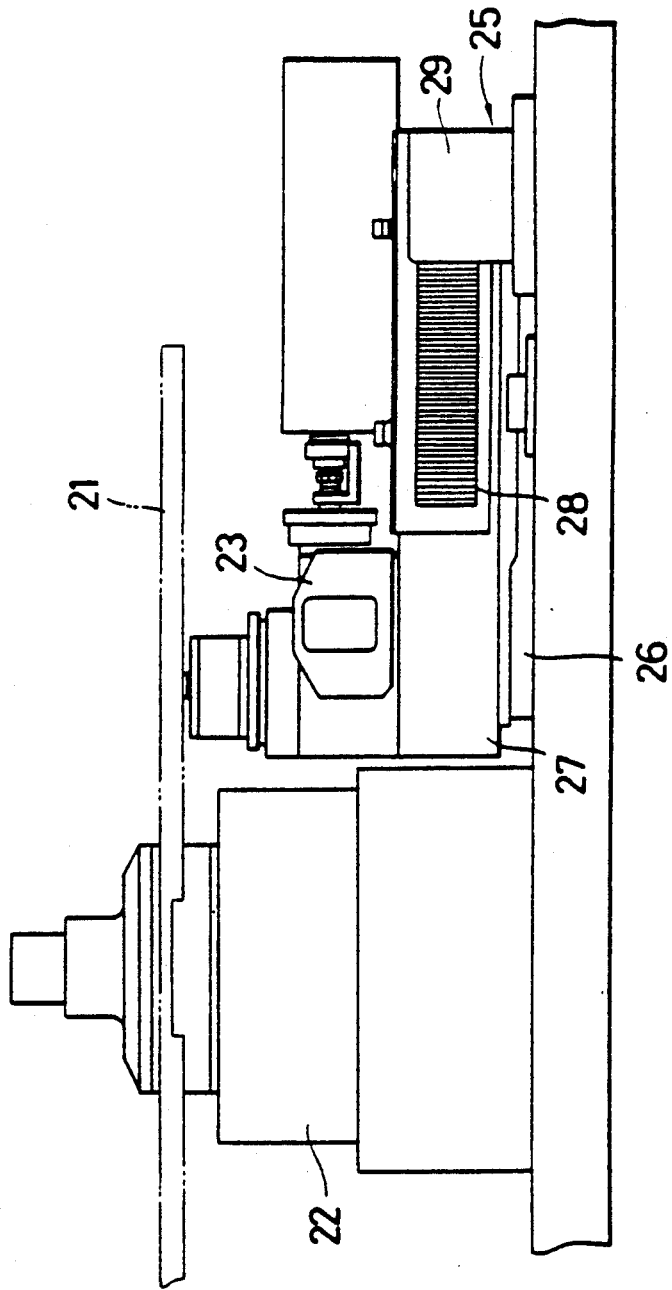
FIG. 7 is a side view showing the linear motor portion of the apparatus of FIG. 6.
Figure 9:
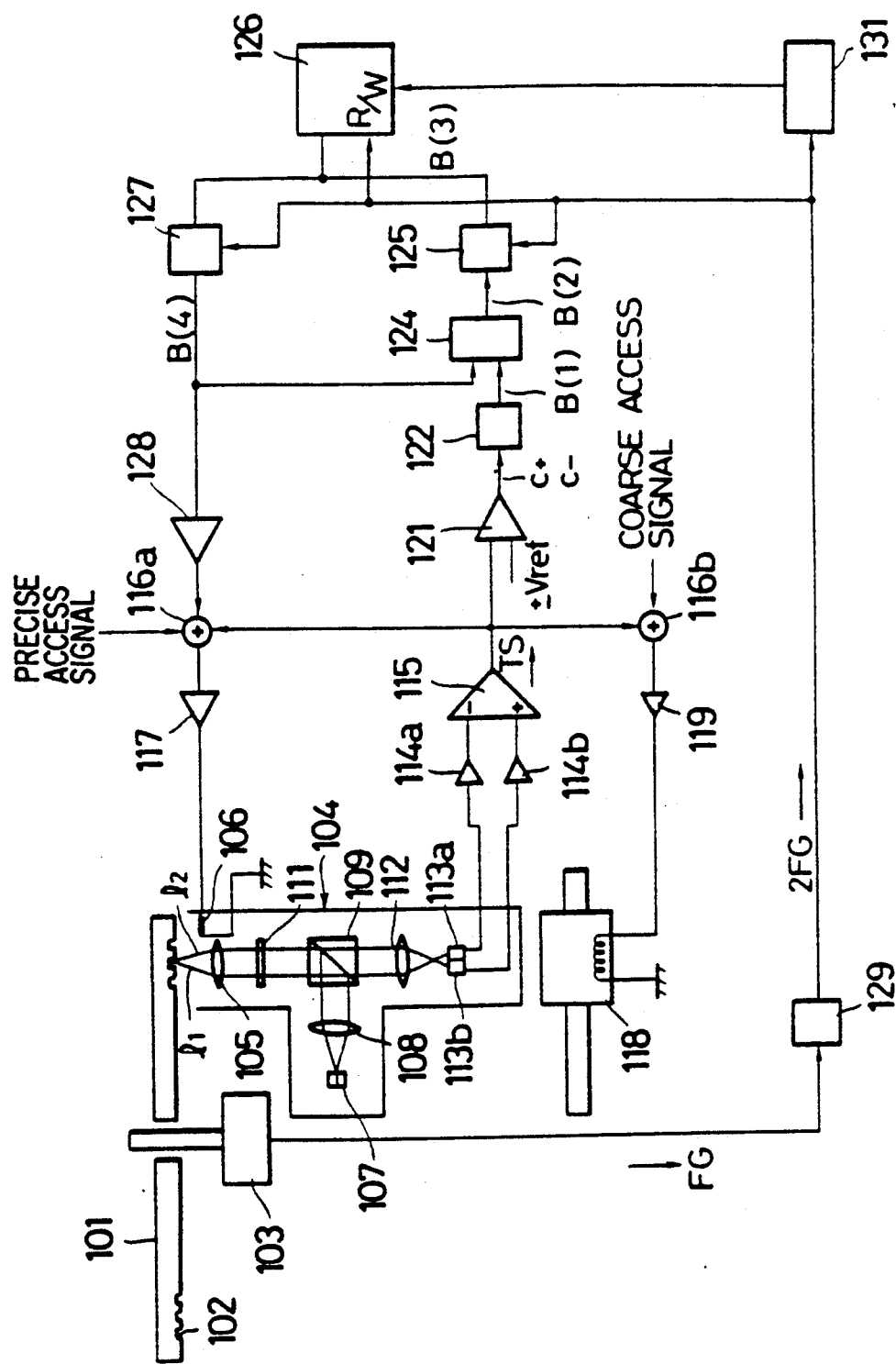
FIG. 9 is a block diagram showing the basic configuration of an eccentricity correction device in an optical disc apparatus in accordance with another embodiment of the present invention.

In FIG. 9, reference numeral 103 is a spindle motor which rotates an optical disc 101, and 104 is an optical head on which an incidence optical system is disposed in addition to the reflection optical system and others shown in FIG. 2. The optical head 104 may be the same as the optical head 23 in FIGS. 6 and 7.

Reflected light rays $l_1$ and $l_2$ from the optical disc 101 pass through a quarter-wavelength plate 111 two times so that their planes of polarization are rotated by a total of 90° and are incident upon a cylindrical lens 112 through a beam splitter 109.

The reflected light rays $l_1$ and $l_2$ are formed into oblong light bundles by the cylindrical lens 112, and the reflected light ray $l_1$ is detected by a photodetector 113a while the other reflected light ray $l_2$ is detected by another photodetector 113b.

A track deviation signal circuit is formed by the photodetectors 113a and 113b, sensor amplifiers 114a and 114b, and a differential amplifier 115. The output terminal of the differential amplifier 115 is connected to a first junction 116a connected via a lens driving circuit or buffer 117 to a driving coil 106.

Through the first junction 116a, the track deviation signal voltage TS, a precise access signal, and an analog voltage from a D/A converter that will be described later, are selectively transferred to the side of the driving coil 106.

The input line of a coarse access signal for moving the optical head is connected via a second junction 116b and a motor driving circuit (buffer) 119 to a linear motor 118. When the eccentricity of the optical disc 101 is large, and where the beam spot has to be moved for a larger distance, the linear motor 118 is driven by the coarse access signal or the like to move the optical head 104 in the desired direction.

Further, between the output terminal of the differential amplifier 115 and the junction 116a, various devices are connected to convert the track deviation signal voltage TS to a digital quantity B(4). Namely, a voltage comparison circuit 121 is connected to the output terminal of the differential amplifier 115. The voltage comparison circuit 121 can be set to the predetermined positive and negative reference voltages $\pm V_{ref}$. The accuracy of conversion of the track deviation signal voltage TS to the digital quantity B(4) is determined by the voltage values of the reference voltages $\pm V_{ref}$. For this reason, the values of the reference voltage $\pm V_{ref}$ are set to those values for which a desired accuracy can be achieved and an appropriate conversion sensitivity can be realized. Here, the values of the reference voltages $\pm V_{ref}$ correspond to the weighting for the least significant bit in the digital quantity B(4).

The reference voltages $\pm V_{ref}$ and the track deviation signal voltage are compared in the voltage comparison circuit 121. An addition signal $C_+$ is output if $TS > +V_{ref}$ and a subtraction signal $C_-$ is output if $TS < -V_{ref}$.

Reference numeral 122 is an addition - subtraction data set circuit which sets digital data B(1) for addition and subtraction based on the addition and subtraction signals $C_+$ and $C_-$ output form the voltage comparison circuit 121.

The output terminal of the addition-subtraction data set circuit 122 is connected to a full adder 124 whose output terminal is connected via a buffer 125 to a memory 126 for storing digital quantities. The memory 126 is connected to a latch circuit 127 which latches the data B(3) read from the memory 126 as a digit quantity B(4). One of the output terminals of the latch circuit 127 is connected to the full adder 124 while the other terminal is connected to a D/A converter 128. The output terminal of the D/A converter 128 is connected to the first junction 116a.

The data B(3) that corresponds to the eccentricity amount stored in the memory 126 comprise eccentricity data for each position on the recording track 102 obtained by subdividing one rotation of the optical disc 101 into a desired number of sectors. As a means for obtaining such a digital quantity B(4), use is made of a frequency generator (FG) pulse generated from a frequency generator (not shown) attached to the spindle motor 103. For example, 76 FG pulses are generated for one rotation of the optical disc 101. Reference numeral 129 is a frequency multiplication circuit which has the function of doubling, for example, the frequency so that an FG pulse is doubled to a 2 FG pulse. The output terminal of the frequency multiplication circuit 129 is respectively connected to the buffer 125, latch circuit 127, memory 126, and an address counter 131.

The buffer 125 displays a high impedance when the 2 FG pulse is at an H level, and it is an active state and transfers the calculated data B(2) from the full adder 124 to the memory 126 when the 2 FG pulse is at an L level. The latch circuit 127 is in an active state when the 2 FG pulse is at the H level, and reads the stored data B(3) in the memory 126. When the 2 FG pulse is at the L level, the circuit 127 holds it as the digital quantity B(4). In addition, the address counter 131 which consists of a loop counter counts the 2 FG pulses to control the address of the memory 126, and 152 items of data corresponding to the eccentricity amount are periodically stored.

To describe the operation of the apparatus, a data B(3) that corresponds to an interim digital quantity is stored in the memory 126 in the beginning. On the other hand, in the track deviation signal circuit, the amount of deviation and direction of deviation of the beam spot with respect to each position on the track 102 are detected. Then a track deviation signal voltage TS is output which has an absolute value proportional to the amount of deviation and which has a positive or negative sign in response to the direction of the deviation in the outward or inward direction of the track.

The track deviation signal voltage TS is compared with the reference voltage $\pm V_{ref}$ in the voltage comparison circuit 121. As a result of this comparison, if the track deviation signal voltage has a positive sign and its value is greater than $\pm V_{ref}$, then an addition signal $C_+$ is output, and an addition data is set in the addition-subtraction data set circuit 122. On the other hand, if the track deviation signal voltage has a negative sign and its value is smaller than $-V_{ref}$, a subtraction signal $C_-$ is output, and a subtraction data is set in the addition-subtraction data set circuit 122.

The addition and subtraction data B(1) is input to the full adder 124. Since an interim digital quantity from the latch circuit 127 is input into the other input terminal of the full adder 124, the addition - subtraction data B(1) are respectively added to and subtracted from the interim digital quantity. A new data B(2) obtained by such operation is stored in the memory 126 as data B(3) when the buffer 125 becomes active.

In this way, the stored data of the memory 126 is rewritten from an interim digital quantity to a corrected data B(3) based on the track deviation signal voltage TS. Further, the data B(3) is read by the latch circuit 127 with the timing at which the latch circuit 127 becomes active. The digital quantity B(4) held in the latch circuit 127 is converted to a analog voltage by the D/A converter 128 and is applied to the driving coil 106 of the objective 105.

A series of processes of the detection of the track deviation signal voltage TS by the track deviation signal circuit, addition and subtraction by the full adder 124, rewriting in the memory 126, and so forth are repeated until the absolute value of the track deviation signal voltage TS becomes smaller than the voltage value of the reference voltages $\pm V_{ref}$ in the voltage comparison circuit 121. This operation is carried out for each position of the track 102 by the address control using the address counter 131 and others.

In the memory 126, eccentricity data B(3) are stored in response to the eccentricity amount of the optical disc 101.

After that, the digital quantity B(4) is converted to an analog voltage by the D/A converter 128 in response to the eccentricity data B(3). The analog voltage $V_{dac}$ for eccentricity correction and a precise access signal are applied to the driving coil 106 so that the high accuracy tracking control can be accomplished even when there is an eccentricity in the optical disc 101.

The detailed constructions of electrical circuits in the optical disc apparatus will be now described with reference to FIGS. 10-13.

Figure 10:
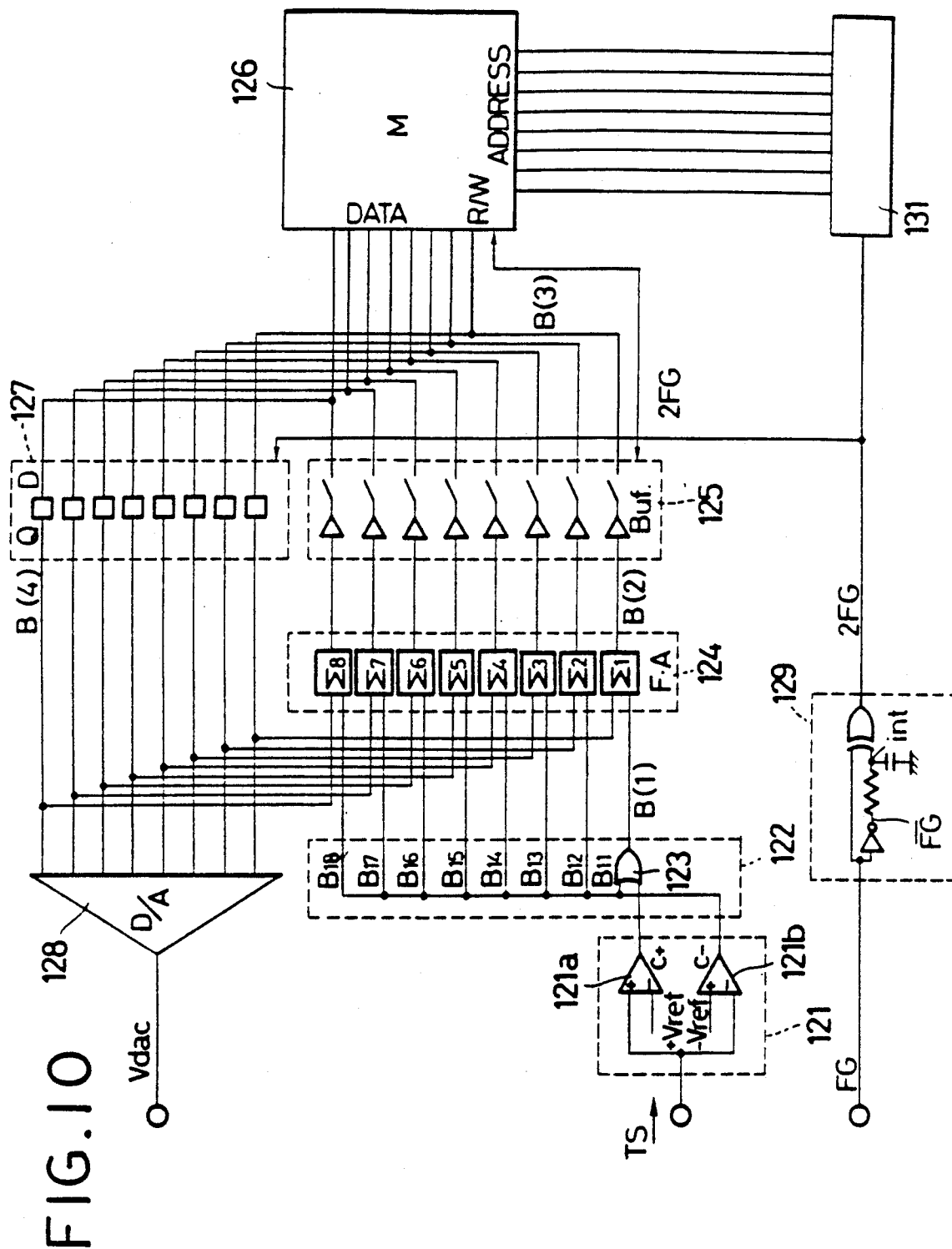
FIG. 10 is a circuit diagram for the embodiment of the present invention shown in FIG. 9, with the optical head and other portions omitted.
Figure 11:
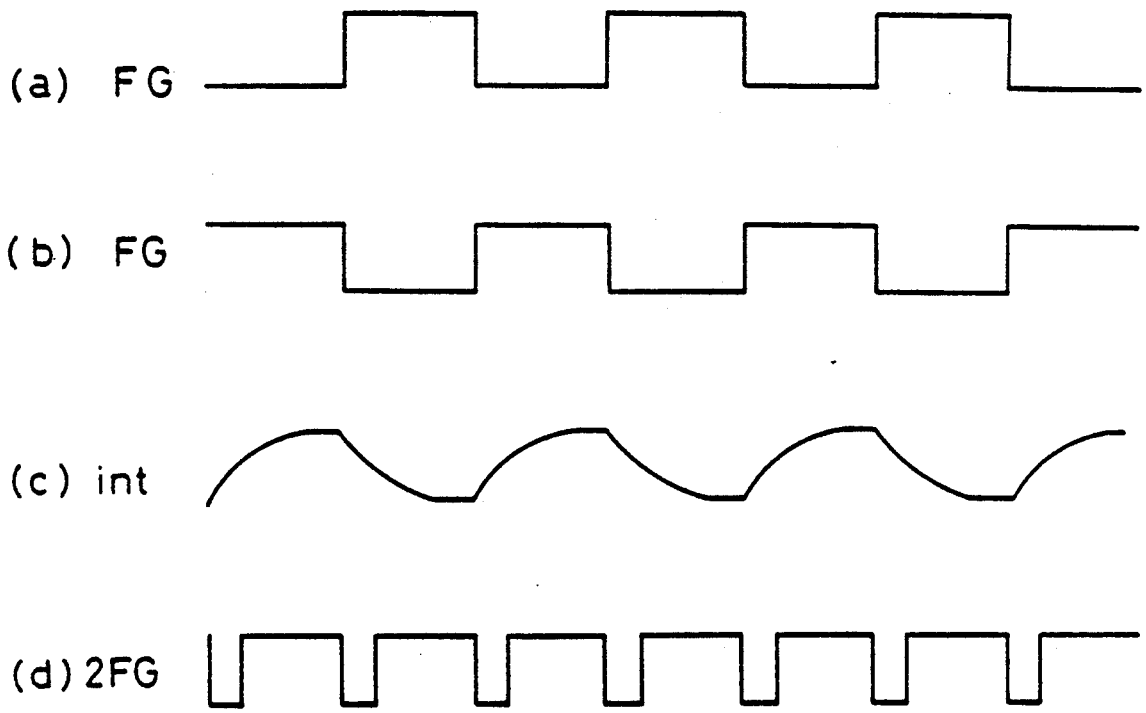
FIGS. 11(a)-11(d) are timing charts illustrating the operation of the frequency multiplying circuit in the embodiment of FIG. 9.
Figure 12:
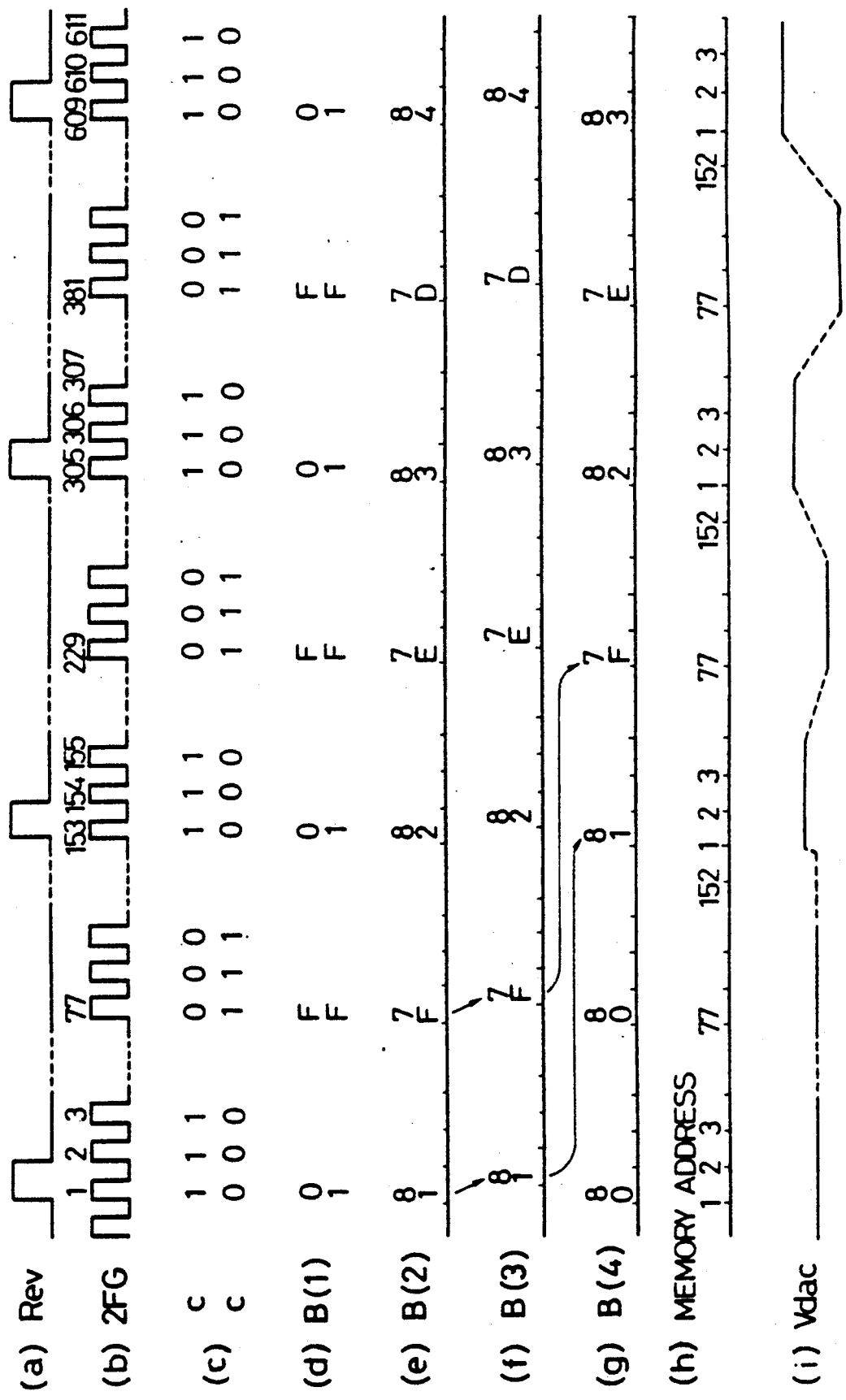
FIGS. 12(a)-(i) are timing charts illustrating the operation of the embodiment of FIG. 9.
Figure 13A:
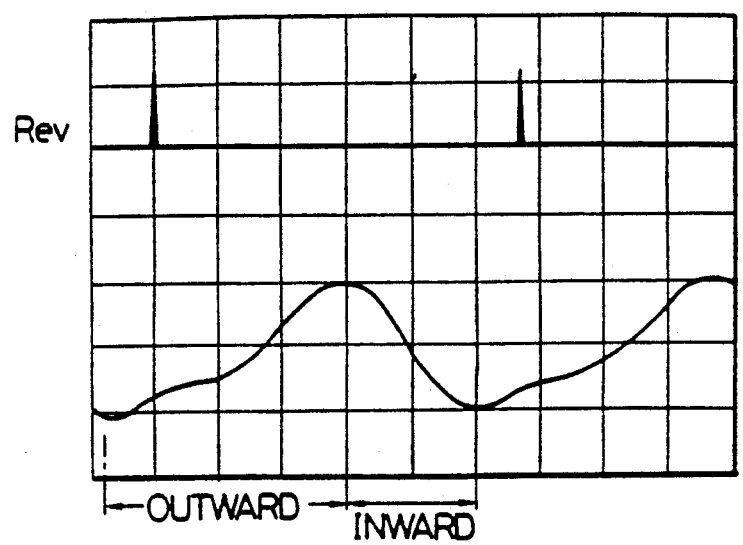
FIGS. 13(A) and 13(B) illustrates waveforms that show the amount of displacement respectively before and after eccentricity correction by the embodiment of FIG. 9.
Figure 13B:
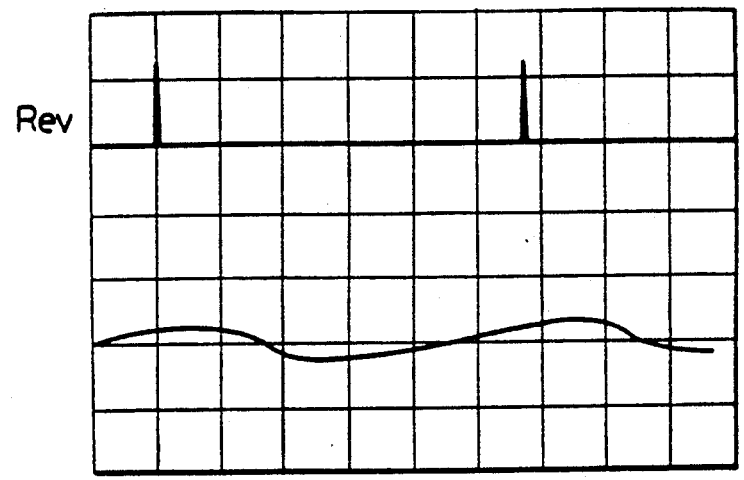
Figure 13C:
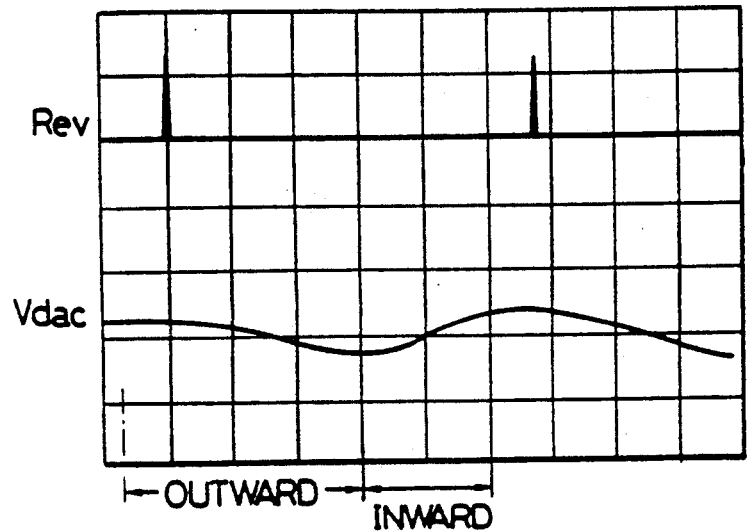
FIG. 13(C) is a waveform diagram which shows the analog voltage for eccentricity correction by the embodiment of FIG. 9.

In this embodiment, various data B(1) to B(4) are processed in 8 bit groups or words. FIG. 10 is a detailed circuit diagram with the optical head and others omitted, FIG. 11(a) to FIG. 11(d) are timing charts for illustrating the operation of the frequency multiplication circuit 129, FIG. 12 is a timing chart for illustrating the operation of the present embodiment, and FIG. 13(A) to FIG. 13(C) are waveform diagrams for showing the eccentricity correction analog voltage and others for illustrating the operation of the embodiment of FIG. 9.

First, the circuit configuration will be described by referring to FIG. 10. In the voltage comparison circuit 121, two voltage comparators 121a and 121b are provided which are set to reference voltages $\pm V_{ref}$ and $-V_{ref}$, respectively. The track deviation signal voltage TS is commonly input to the voltage comparators 121a and 121b and is simultaneously compared with the reference voltages $\pm V_{ref}$.

In the addition - subtraction data set circuit 122 only one OR circuit 123 is provided, and the output terminals of the voltage comparators 121a and 121b are respectively connected to the two inputs of the OR circuit 123.

From the OR circuit 123, the least significant bit $B_{11}$ of the addition - subtraction data $B(1)=(B_{18}, B_{17}, \ldots, B_{11})$ is output. The other bit $B_{18}, B_{17}, \ldots, B_{12}$ are directly output from the comparator 121b.

When the track deviation signal voltage TS is greater than the reference voltage $\pm V_{ref}$, the output of the voltage comparison circuit 121 has an addition signal $C_+$ of "1" and the addition - subtraction data $B(1)=(00000001)=(0\ 1_H)$. On the other hand, if the track deviation signal voltage TS is smaller than the reference voltage $-V_{ref}$, then the output of the voltage comparison circuit 121 has a subtraction signal $C_-$ of "1" and the addition - subtraction data is set to $B(1)=(11111111)=(F\ F_H)$ Table 1 shows the above relationship in a tabular form.

TABLE 1

| TS | B(1) |
|---|---|
| $-V_{ref} < $ TS | $0\ 1_H$ |
| $-V_{ref} < $ TS $ < +V_{ref}$ | $0\ 0_H$ |
| TS $< -V_{ref}$ | $F\ F_H$ |

The full adder 124 uses an ordinary 8-bit system and the addition and subtraction data $B(1)$ output from the addition - subtraction data set circuit 122 is added or subtracted from the digital quantity $B(4)$ input from the latch circuit 127, and the data $B(2)$ obtained by the operation is output to the buffer 125. Namely, the output data $B(2)$ of the full adder 124 is given by $$B(2) = B(1) + B(4) \quad (1)$$

where the right-hand side represents an addition for TS $> V_{ref}$ and a subtraction if TS $< -V_{ref}$. When $|TS| < V_{ref}$ is realized, the correction is completed with $B(1)=00_H$.

The buffer 125 is driven by a 2 FG pulse, and displays a high impedance, on open state, when the 2 FG pulse is at the H level and is in an active state when the 2 FG pulse is at the L level.

The series of operating timings of the buffer 135, memory 126, and latch circuit 127 driven by a 2 FG pulse are shown in Table 2.

TABLE 2

| 2FG | Memory (126) | Latch Circuit (127) | Buffer (125) |
|---|---|---|---|
| H | Read | Active | Open |
| L | Write | B(4) ← B(3) Hold B(4) | B(3) ← B(2) |

Writing of the data $B(3)$ to the memory 126 is controlled by the address counter 131, and the data $B(3)$ is stored with the address shifted by 1 each, i.e., they are stored sequentially. In order for one revolution of the optical disc 101 to be subdivided into 152 parts by 2 FG pulses and to be able to store the data $B(3)$ with the accuracy of 8 bits, the memory 126 is required to have a capacity of more than 1.2K bits.

The frequency multiplication circuit 129 which doubles the FG pulses is composed of an integration circuit consisting of an inverter, a resistor, and a capacitor, and an EXOR circuit. FIGS. 11(a) to FIG. 11(d) illustrate the doubling operation of the frequency multiplication circuit 129 by which the 2 FG pulse waveform in FIG. 11(d) is output by taking an exclusive logical sum of an FG pulse in FIG. 11(b) and the integration voltage in FIG. 11(c).

FIG. 12(a) is a revolution pulse chart that shows the revolving position of the spindle motor 103, and the timing chart is drawn by assuming that 76 periods of FG pulses are generated during 1 period of the revolution pulse $R_{ev}$. The FG pulses are doubled by the frequency multiplication circuit 129 to generate 2 FG pulses shown in FIG. 12(b), and they are counted by the address counter 131 to control the memory address in FIG. 12(h). Therefore, one rotation of the optical disc 101 is equally subdivided into 152 parts, and the eccentricity data at each of the subdivided position is converted to a digital quantity $B(3)$ to be stored in the memory 126.

It will be assumed that the memory 126 is initialized to $B(4) = (10000000) = 80_H$. The reason for setting the initialization to $B(4)=80_H$ is to let the analog voltage $V_{dac}$ converted by the D/A converter 128 oscillate in dipolar manner in positive and negative directions with 0 V as the center. In other words, the inner circuit of the D/A converter 128 is constructed to have the following relationship between the digital quantity $B(4)$ and the analog voltage $V_{dac}$ that is converted:

| B(4) | $V_{dac}$ |
|---|---|
| $11111111 = FF_H \rightarrow$ | $+V_{fs}$ |
| $10000000 = 80_H \rightarrow$ | 0 |
| $00000000 = 00_H \rightarrow$ | $-V_{fs}$ | where $V_{fs}$ means the full scale of the analog voltage $V_{dac}$.

If in the voltage comparison circuit 121 the track deviation signal voltage satisfies TS $> +V_{ref}$ at the first position of the 2 FS pulses, an addition signal $C_+ = 1$ and a subtraction signal $C_- = 0$ will be output. But this output, an addition data $B(1)=01_H$ is set in the addition - subtraction data set circuit 122. Since the initial value $B(4)=80_H$ of the memory 126 is input from the latch circuit 127 to the full adder 124, the addition data $B(1)$ in the above is added to the initial value $B(4)$. The new data after such operation becomes $B(2)=81_H$, and this data $B(2)$ is written and stored in the memory 126 as a data $B(3)$ with the L level timing of the 2 FG pulses. In this case, the memory address remains at 1.

Suppose that the optical disc 101 is rotated and at the 77th position of the 2 FG pulses, for example, the track deviation signal voltage TS satisfies the relation TS $< -V_{ref}$. Then, a subtraction signal $C_- = 1$ is output from the voltage comparison circuit 121. By this output, the subtraction data $B(1) = FF_H$ is set in the addition - subtraction data set circuit 122. In the full adder 124, a subtraction of the subtraction data $B(1) = FF_H$ from the initial value $B(4) = 80_H$, in other words, the operation of $FF_H + 80_H = 7F_H$, is carried out, and a newly calculated data $B(2)$ is output.

$$\begin{array}{r} B(1) = FF_H \\ +) \ B(4) = 80_H \\ \hline B(2) = 7F_H \end{array}, \text{ or } \begin{array}{r} 11111111 \\ +) \ 10000000 \\ \hline 10111111 \end{array}$$

Since the operation is carried out in terms of 8 bits, the overflow data "1" in the ninth bit will be neglected. The calculated data $B(2) = 7F_H$ is written and stored in the memory address 77.

When the optical disc 101 makes one rotation, at the 153rd position of the 2 FG pulse, the memory address returns again to 1. The data $B(3) = 81_H$ written and stored during the previous rotation is read by the latch circuit 127, and the digital quantity that is to be held becomes $B(4) = 81_H$. If the track deviation signal voltage at this time satisfies TS $> +V_{ref}$, the addition signal $C_+ = 1$ and the addition data $B(1) = 01_H$ are obtained, and a new data $B(2) = 82_H$ obtained by the operation is output from the full adder 124 and the data for the memory address 1 is rewritten to $B(3) = 82_H$.

When the optical disc 101 is rotated to the 229th position of the 2 FG pulses, the memory address becomes 77, and the data $B(3) = 7F_H$ of the previous low 2 FG pulse state or iteration is read by the latch circuit 127. Thereafter, similar to the above, the addition and subtraction operation is also carried out with 152 pulses of the 2 FG pulse waveform as one period.

If, at all of the rotation positions corresponding to the memory addresses from 1 to 152, the absolute value of the track deviation signal voltage TS satisfies the condition $|TS| < V_{ref}$, then the addition and subtraction data becomes $B(1) = 00_H$ with no need for the generation of change in $B(2)$, $B(3)$, and $B(4)$, so that recording of the eccentricity data is completed.

Next, referring to FIG. 13(A) to FIG. 13(C), the effects of eccentricity correction in the embodiment of FIG. 9 will be described. FIGS. 13(A) and 13(B) represent the amount of displacement of the linear motor 118 with respect to the rotation of the optical disc 101 as scale (SCK) signals. FIG. 13(A) and FIG. 13(B) are waveforms that show the amount of displacement before and after the eccentricity correction, respectively. FIG. 13(C) is a waveform diagram which shows the analog voltage $V_{dac}$ for eccentricity correction output from the D/A converter 128 as a result of recording of the eccentricity data into the memory 126.

In FIGS. 13(A) to 13(C), the waveforms of the symbol $R_{ev}$ are the signal waveforms that show the rotation position of the spindle motor 103, and the rotation position of the optical disc 101 can be shown by these signals.

Before giving an eccentricity correction, the amount of deviation of the beam spot from the track 102 is large so that, as shown in FIG. 13(A), with a large displacement of the linear motor 118, the optical head follows the motion of the track 102. A positive inclination of the displacement indicates an outward displacement and a negative inclination indicates an inward displacement. Therefore, FIG. 13(A) shows that in the first half of the rotation of the optical disc 101 the linear motor 118 move to the outer periphery side of the optical disc 101, and in the latter half it moved inward.

FIG. 13(C) shows that when there exists an eccentricity state as above, the eccentricity data is obtained by the memory 126, and the digital quantity $B(4)$ that corresponds to the eccentricity amount is output as an analog voltage for eccentricity correction $V_{dac}$ by the D/A converter 128.

The objective 105 moves outward for a negative inclination of the analog voltage $V_{dac}$ and moves inward for a positive inclination, so that the direction of movement of the objective 105 coincides with the direction of motion of linear motor 118 shown in FIG. 13(A).

FIG. 13(B) shows the amount of displacement of the linear motor 118 when the position of the objective 105 is controlled by the analog voltage for eccentricity correction. From FIG. 13(B) it will be seen that, after eccentricity correction, the amount of displacement of the linear motor 118 is markedly reduced and that the eccentricity correction is being carried out extremely effectively.

After the eccentricity correction data is obtained as in the above, by carrying out the tracking control with the addition of the analog voltage $V_{dac}$ for eccentricity correction to the precise access signal, it becomes possible to follow the track 102 with high accuracy by only the movement of the objective 105.

In addition, in carrying out track jumping, the amount of eccentricity correction is identical if the rotation position is the same so that by the addition of the analog voltage $V_{dac}$ for eccentricity correction as it is to the jump pulse, an accurate and stable track jump becomes possible.

As described in the foregoing, according to the present invention, a digital quantity corresponding to the eccentricity quantity of the optical disc is stored in the memory, and the analog voltage for eccentricity correction obtained by D/A converting the digital quantity is added to driving means of the objective. Accordingly, tracking control with high accuracy can be achieved even when an eccentricity exists in the optical disc. Moreover, in carrying out track jumping, an analog voltage for eccentricity correction output from the D/A converter can be applied as it is to the driving means for the objective along with the jump pulse. Therefore, there is an advantage that track jumping can be carried out accurately and stably while applying the eccentricity correction.

Next, referring to FIG. 14, the principle of the weighted operation type A/D converter which is used to convert an analog quantity to a digital quantity in another embodiment of the optical disc apparatus of the present invention will be described in association with data for eccentricity correction.

Figure 14:
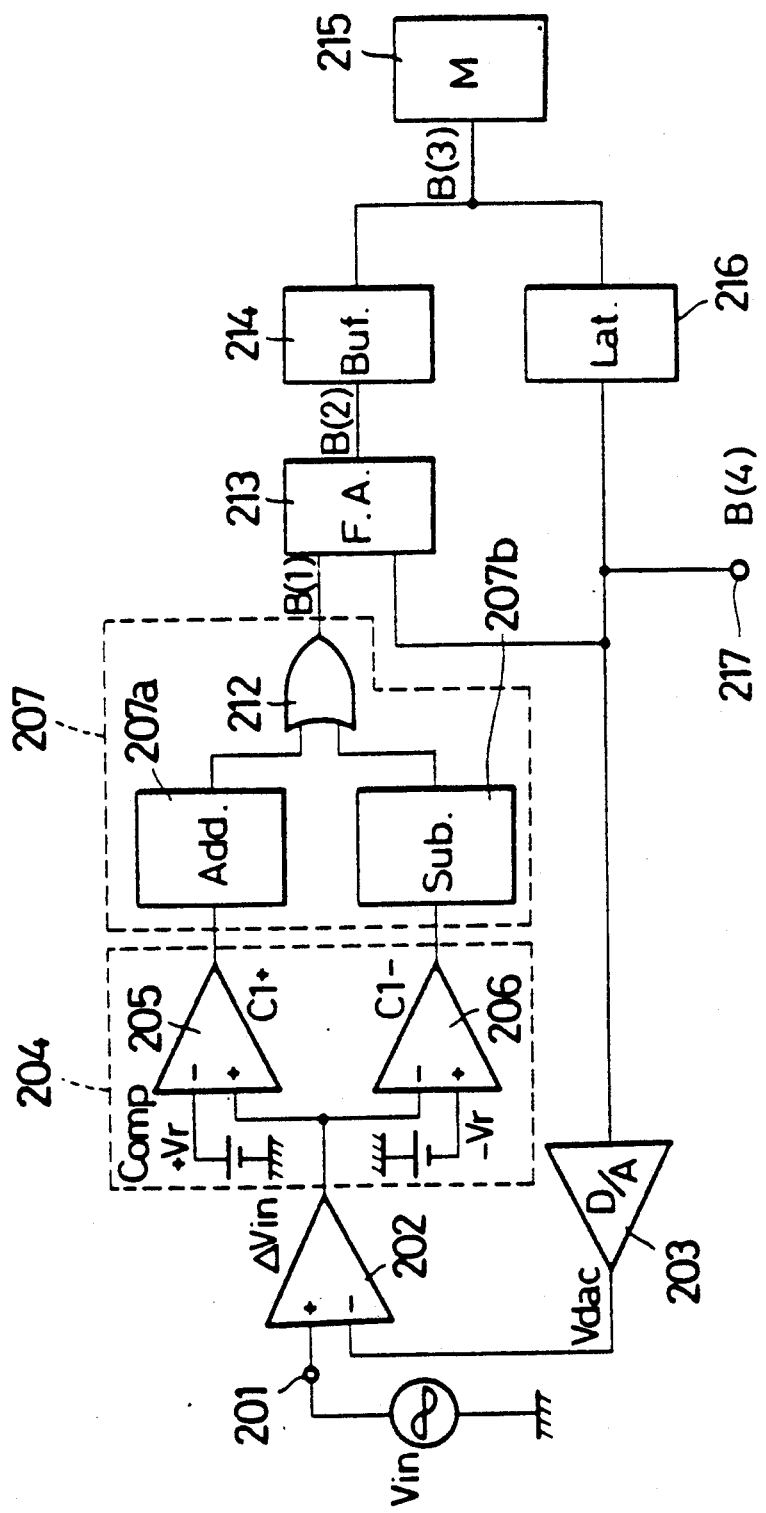
FIG. 14 is a block diagram showing the basic configuration of a weighted operation type A/D converter in accordance with another embodiment of the present invention.

In FIG. 14, reference numeral 201 is the input terminal of an input analog voltage $V_{in}$ and a differential amplifier 202 outputs the difference voltage $\Delta V_{in}$ between the input analog voltage $V_{in}$ and an analog voltage $V_{dac}$ generated from a D/A converter 203 that constitutes a feedback circuit.

Reference numeral 204 is a voltage comparison circuit, and when the digital quantity $B(4)$ is assumed to be of n bits, there are 2n voltage comparators 205 and 206. Further, a corresponding plurality of positive and negative reference voltages $+V_r$ and $-V_r$ are provided, each of which corresponds to the weighting of each bit in the digital quantity B(4). These reference voltages $+V_r$ and $-V_r$ are set to the respectively corresponding voltage comparators 205 and 206.

An addition - subtraction data set circuit 207 contains an addition data set section 207a, a subtraction data set section 207b, and an OR circuit 212 which takes a logical sum of the outputs of both data set sections 207a and 207b.

The output terminal of the OR circuit 212 is connected to a full adder 213 whose output terminal is connected via a buffer 214 to a memory 215 for storing digital quantities. The memory 215 is connected to a latch circuit 216 for latching the data B(3) read from the memory 215, and the output terminal of latch circuit 216 is connected to the D/A converter 203.

Since the data latched to the latch circuit 216 becomes a digital quantity B(4) which is a D/A converted, the output terminal 217 of the digital quantity B(4) is connected to the output terminal of the latch circuit 216.

An interim digital quantity initially stored in the memory 215 is read by the latch circuit 216, and an analog voltage $V_{dac}$ proportional to the interim digital quantity is generated. In the differential amplifier 202, the difference is taken between the input analog voltage $V_{in}$ input from the input terminal 201 and the analog voltage $V_{dac}$ generated in the D/A converter 203, and the difference voltage $\Delta V_{in}$ given by.

$$\Delta V_{in} = V_{in} - V_{dac}. \quad (2)$$

is output. The value of the difference voltage $\Delta V_{in}$ is proportional to the conversion error.

The difference voltage $\Delta V_{in}$ is simultaneously compared with a plurality of reference voltages $+V_r$ and $-V_r$ in the voltage comparison circuit 204. As a result, if the difference voltage $\Delta V_{in}$ has a positive sign and its value is greater than the reference voltage $+V_r$, $C_{1+}$ is output from the voltage comparator 205. Then, in an addition data set section 207a of an addition - subtraction data set circuit 207, a binary number is set for addition data with weighting that corresponds to the absolute value of the difference voltage $\Delta V_{in}$. On the other hand, if the difference voltage $\Delta V_{in}$ has a negative sign and its value is smaller than the reference voltage $-V_r$, $C_{1-}$ is output from the voltage comparator 206, and a binary number for subtraction data with weighting that corresponds to the absolute value of the difference voltage $\Delta V_{in}$ is set in the subtraction data set section 207b of the addition - subtraction data set circuit 207.

The addition data and the subtraction data are logically summed in the OR circuit 212, and the addition subtraction data B(1) are input to the full adder 213. An interim digital quantity is input from the latch circuit 216 to the other input terminal of the full adder 213 so that the addition - subtraction data B(1) is added and subtracted from the interim digital quantity. The new digital quantity B(2) obtained as the result of the above operation is stored in the memory 215 via the buffer 214. The stored data in the memory 215 is rewritten from the interim digital quantity to a digital quantity B(3) corrected based on the difference voltage $\Delta V_{in}$.

The correction operation by addition and subtraction of the full adder 213 or the like is repeated until the absolute value of the difference voltage $\Delta V_{in}$ becomes smaller than the reference voltage which corresponds to the weighting for the least significant bit, in other words, until the condition $-V_r < \Delta V_{in} + V_r$ is satisfied.

In this way, eventually a digital quantity B(4) A/D converted with high accuracy can be output from an output terminal 217.

Next, another embodiment of the electrical circuits mentioned above will be described with reference to FIGS. 15 to 23. An A/D converter of 4 bits is used in the following embodiment.

Figure 15:
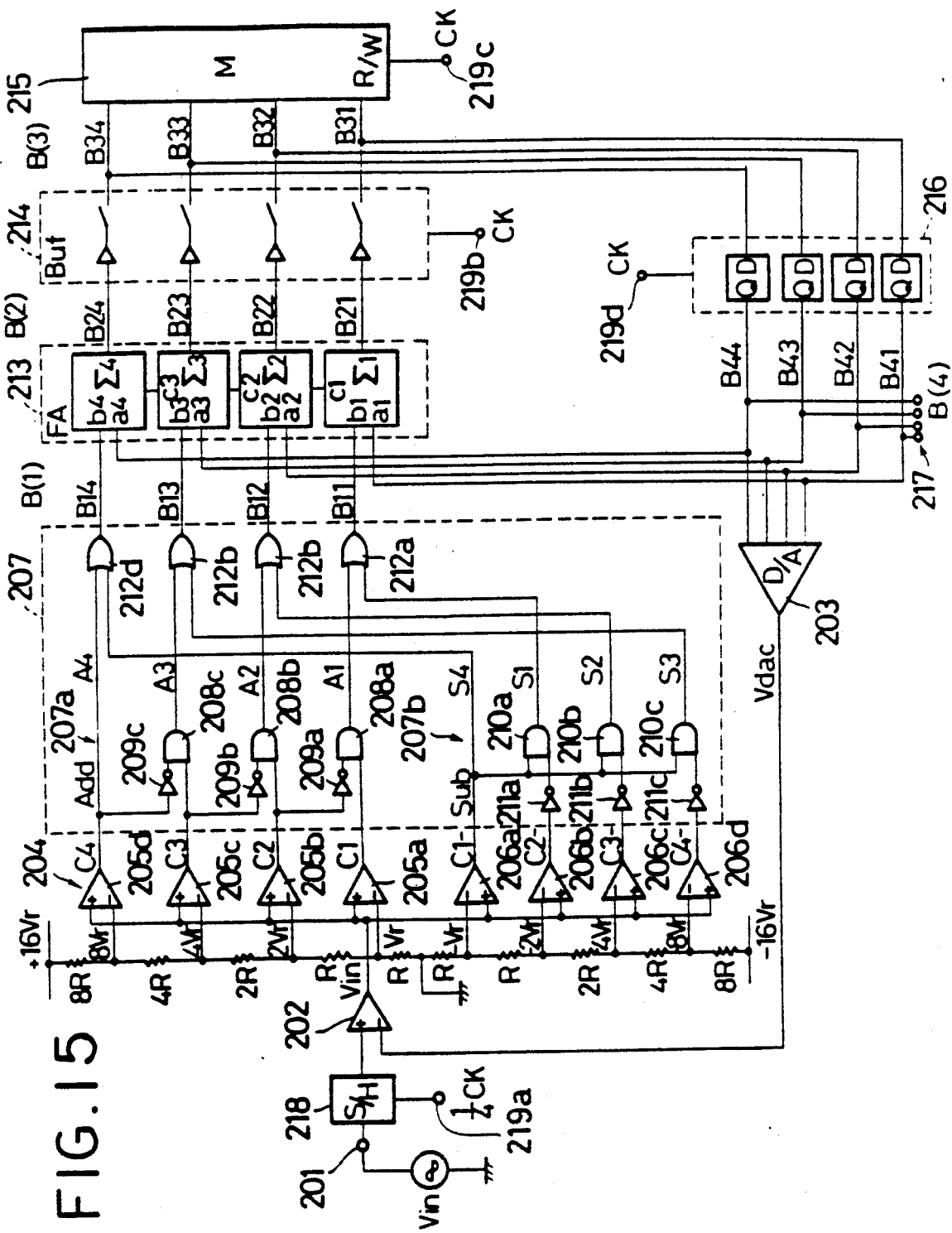
FIG. 15 is a block diagram showing the overall configuration of a weighted operation type A/D converter in accordance with another embodiment of the invention.

Referring to FIG. 15 which shows the overall configuration of the A/D converter, a sample hold circuit 218 is connected between an input terminal 201 and a differential amplifier 202. The sample hold circuit 218 is for temporarily holding an input analog voltage $V_{in}$, and is used to avoid influence on the output digital quantity B(4) due to variations in the input analog voltage $V_{in}$ during A/D conversion.

In a voltage comparison circuit 204, eight voltage comparators 205a to 205d and 206a to 206d are provided side by side, the number eight corresponding to twice the number of bits of the A/D converter. Further, a voltage of $+16V_r$ is divided by a voltage dividing circuit formed by connecting five resistors with resistances R, 2R, 4R, and 8R in series to generate positive reference voltages with values that correspond to the weightings for the bits, namely, $V_r$, $2V_r$, $4V_r$, and $8V_r$ set to the voltage comparators 205a, 205b, 205c, and 205d, respectively. On the other hand, a voltage of $-16V_r$ is divided by another voltage dividing circuit formed by connecting five resistors similar to the above, to generate negative reference voltages with absolute values that correspond to the weightings for the bits, namely, $-V_r$, $-2V_r$, $-4V_r$, and $-8V_r$ set to the voltage comparators 206a, 206b, 206c, and 206d, respectively.

In an addition data set section 207a of an addition - subtraction data set circuit 207, three AND circuits 208a, 208b, and 208c are arranged side by side. One of the two inputs of the AND circuit 208a is directly connected to the voltage comparator 205a and the other input is connected via an inverter 209a to the voltage comparator 205b. For the other two AND circuits 208b and 208c, the situation is similar to the case of the AND circuit 208a. Namely, for the AND circuit 208b, the voltage comparator 205b is connected directly, and the voltage comparator 205c is connected via an inverter 209b. For the AND circuit 208c, the voltage comparator 205c is connected directly, and the voltage comparator 205d is connected via an inverter 209c. For the subtraction data set section 207b, the conditions for connection are similar to the above, with three AND circuits 210a to 210c and three inverters 211a to 211c arranged side by side.

For the full adder 213, use is made of a disclosed type which will be described later. The full adder adds or subtracts the addition - subtraction data B(1)=$B_{14}$ to $B_{11}$ output from the addition - subtraction data set circuit 207, from the digital quantity ($B_{44}$ to $B_{41}$) input from the latch circuit 216, and outputs the data B(2)=$B_{24}$ to $B_{21}$ obtained after the above operation to the buffer 214.

The buffer 214 is driven by a clock pulse CK input from a terminal 219b. The buffer 214 displays a high impedance when the clock pulse CK is at the H level, and when the clock pulse is at the L level, it becomes active and transfers the data B(2)=$B_{24}$ to $B_{21}$ from the full adder 213 to the memory 215.

The timing relationships for a series of operations of the buffer 214, memory 215, and latch circuit 216 driven by the clock pulse CK are shown in Table 3.

TABLE 3

| CK | Memory (215) | Buffer (214) | Latch Circuit (216) | Mode |
|---|---|---|---|---|
| "H" | Read | High Impedance | Active | Read |
| "L" | B(3) Write B(3) | → Active ← B(2) | B(4) Latch | Write |

As in the table, generally speaking, when the clock pulse is at the H level, data is read from the memory 215 and when it is at the L level, data is written in the memory 215.

Next, referring to FIG. 16 to FIG. 22, the configuration, function, and so on of each circuit portion will be described in more detail.

Figure 16:
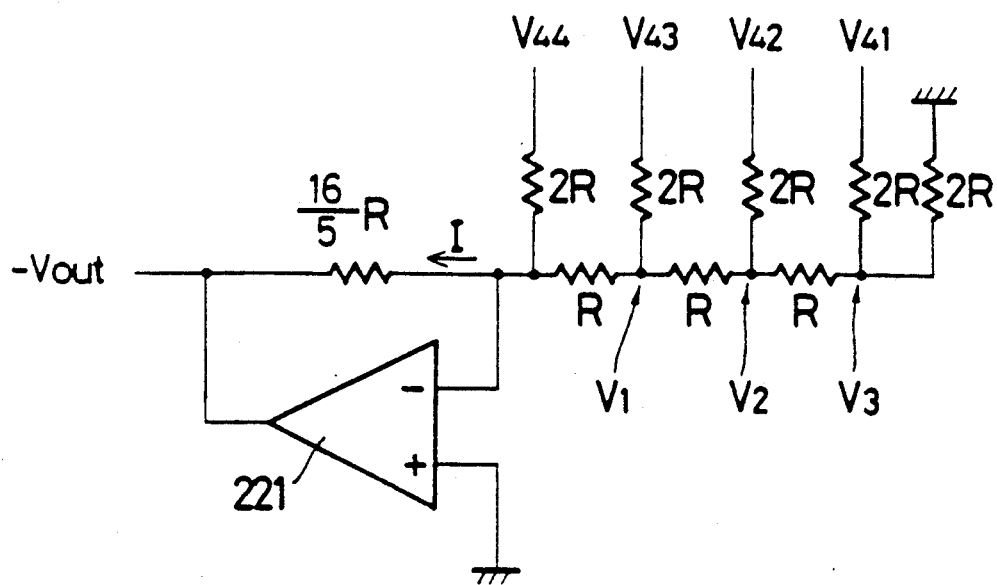
FIG. 16 is a circuit diagram for a portion of the D/A converter in FIG. 15.

First, referring to FIG. 16, a main portion of the 4-bit D/A converter 203 consists of a ladder type resistor circuit formed by five resistors that have resistance of 2 R and three resistors that have resistance of R, and an inverting amplifier formed by an operational amplifier 221 and a resistor with resistance (16/5)R.

When voltages $V_{41}$, $V_{42}$, $V_{43}$, and $V_{44}$ are applied to one end of the respective resistors with resistance 2 R, and voltages $V_3$, $V_2$, and $V_1$ appear at the respective connection points of resistors with resistance R, as in FIG. 16, the following relations are formed by Kirchhoff's law.

$$(V_{43} - V_1)/2R - V_1/R + (V_2 - V_1)/R = 0, \quad (3)$$

$$(V_{42} - V_2)/2R + (V_1 - V_2)/R + (V_3 - V_2)/R = 0,$$

$$(V_{41} - V_3)/2R + (V_2 - V_3)/R - V_3/2R = 0.$$

From Eq. (3) there follows $$V_{43} - 5V_1 + 2V_2 = 0, \quad (4)$$

$$V_{42} + 2V_1 - 5V_2 + 2V_3 = 0, \quad (5)$$

$$V_{41} + 2V_2 - 4V_3 = 0 \quad (6)$$

By calculating Eq. (5)×2+Eq. (6) there is obtained $$2V_{42} + V_{41} + 4V_2 - 8V_2 = 0. \quad (7)$$

By multiplying Eq. (4) by 4 there is obtained $$4V_{43} - 20V_1 + 8V_2 = 0. \quad (8)$$

From Eq. (5)+Eq. (7), $$V_{41} + 2V_{42} + 4V_{43} - 16V_1 = 0. \quad (9)$$

By defining I as the current that flows through the feedback resistor in the inverting amplifier, one obtains $$I = V_{44}/2R + V_1/R \quad (10)$$

Substituting the value of $V_1$ obtained from Eq. (9) into Eq. (10), $$I = (1/16R) \cdot (V_{41} + 2V_{42} + 4V_{43} + 8V_{44}). \quad (11)$$

The analog output voltage in the circuit of FIG. (16) is given by $$-V_{out} = (16/5)RI \quad (12)$$

$$= (1/5)(V_{41} + 2V_{42} + 4V_{43} + 8V_{44}).$$

In the above, each of the voltage $V_{41}$ to $V_{44}$ in Eq. (12) corresponds to the digital quantity $B(4) = B_{44}$ to $B_{41}$ output from the latch circuit 216 as shown in FIG. 15. Therefore, if the voltage of the digital quantity $B(4) = B_{44}$ to $B_{41}$ when it is at the H level is set, for example, to $V_{cc} = 5$ V, the analog output voltage $-V_{out}$ can be rewritten as the following.

$$-V_{out} = (1/5)(B_{41} \times 5V + B_{42} \times 2 \times 5V + \quad (13)$$

$$B_{43} \times 4 \times 5V + B_{44} \times 8 \times 5V)$$

$$= B_{41} + 2B_{42} + 4B_{43} + 8B_{44}(V).$$

In the circuit shown in FIG. 16, the analog output voltage has a negative value as shown by Eq. (13) above so that the D/A converter 203 in FIG. 15 is further connected to a voltage inverting circuit that uses an operational amplifier 222, as will be shown in FIG. 17. From the D/A converter 203, an analog voltage $V_{dac}$ ($= V_{out}$) is output as shown by the following equation.

$$V_{dac} = k(B_{41} + 2B_{42} + 4B_{43} + 8B_{44}). \quad (14)$$

As explained in connection with Eq. (13), it is possible, by properly setting the circuit constants and the value of $V_{cc}$, to choose $k = 1$, so the following description will be made on the assumption that $k = 1$. In this case, for the various values of the digital quantity $B(4) = B_{44}$ to $B_{41}$, analog voltage $V_{dac}$ with the following values ar obtained.

TABLE 4

| $B_{44}$ | $B_{43}$ | $B_{42}$ | $B_{41}$ | $V_{dac}$ (Volt) |
|---|---|---|---|---|
| 0 | 0 | 0 | 0 | 0 |
| 0 | 0 | 0 | 1 | 1 |
| 0 | 0 | 1 | 0 | 2 |
| . | . | . | . | . |
| . | . | . | . | . |
| . | . | . | . | . |
| 1 | 1 | 1 | 1 | 15 |

Figure 17:
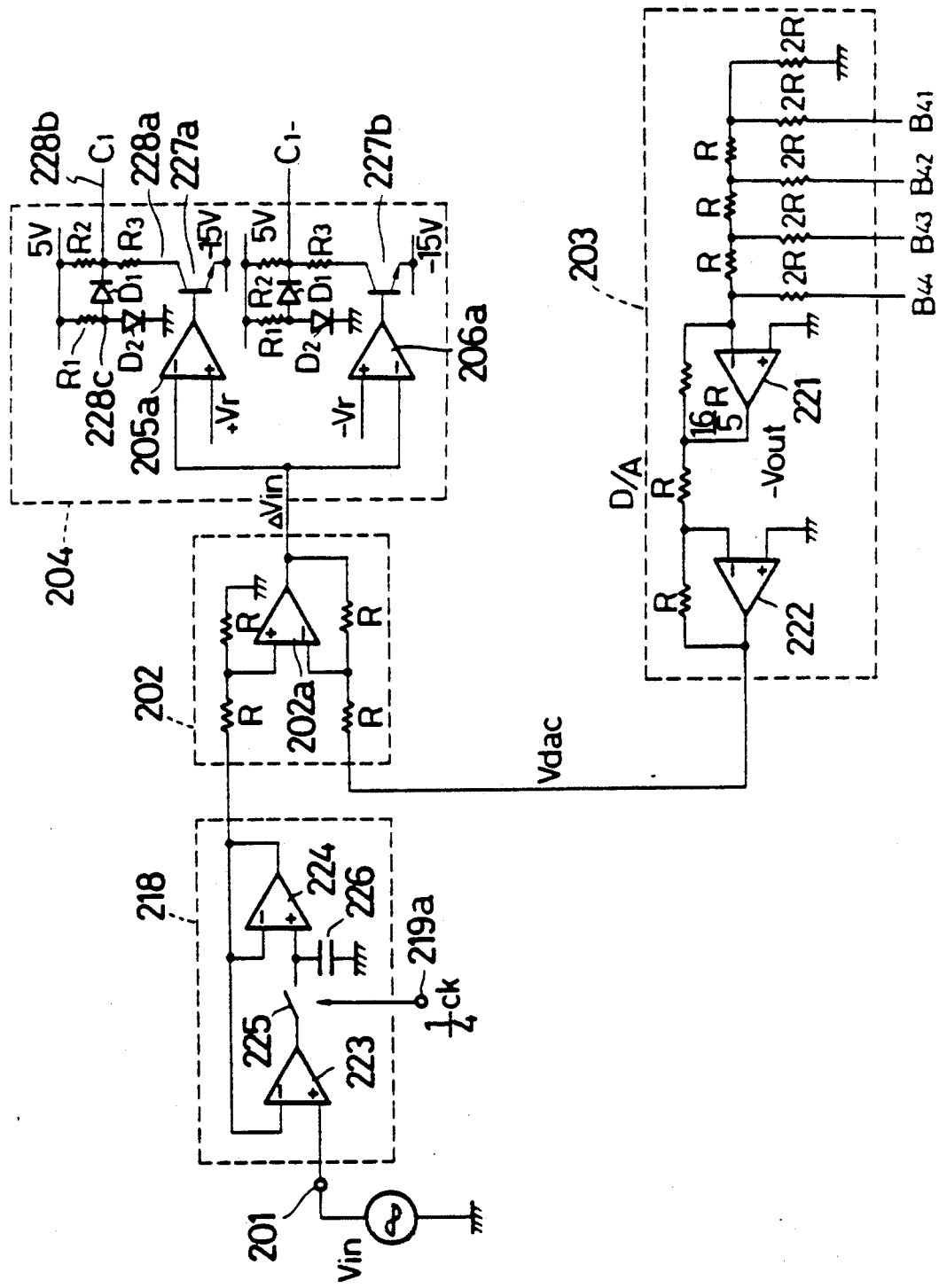
FIG. 17 is a circuit diagram showing greater detail for parts of the circuit of FIG. 15.

Next, referring to FIG. 17, sample hold circuit 218, differential amplifier 202, voltage comparison circuit 204, and the analog circuit portion including the D/A converter 203 mentioned in connection with FIG. 16 will be described.

The sample hold circuit 218 consists of two operational amplifiers 223 and 224, and a switch 225 and a capacitor 226 connected between the operational amplifiers 223 and 224. The switch 225 is driven by (¼) CK obtained by frequency-dividing the clock CK into four, and the input analog voltage $V_{in}$ is held in the capacitor 226. The differential amplifier 202 is of the ordinary type that consists of an operational amplifier 202a.

With respect to the voltage comparison circuit 204, transistors 227a and 227b are connected to the output terminals of the voltage comparators 205a to 205d and 206a to 206d, although these are omitted in FIG. 15. In addition, an analog-logic interface circuit constructed by two diodes $D_1$ and $D_2$ and three resistors $R_1$, $R_2$, and $R_3$, is connected to the output terminal of each of the voltage comparators.

In contrast to the analog circuit portion operated by a power supply voltage, for example, of ±15 V, the logic circuit portion that follows the addition - subtraction data set circuit 207 is operated, for example, by a power supply voltage of +5 V, so the ranges of operating voltage for both circuit portions are ordinarily different from each other. For this reason, an interface circuit is used to supply signals with normal logical amplitude from the analog circuit portion to the logic circuit portion.

To describe the operation of the interface circuit, if $\Delta V_{in} < +V_r$ and the output of the voltage comparator 205a is at the H level, the transistor 227a is turned on, and the voltage $V_1$ at the input terminal 228a becomes $$V_1 = V_{ee} + V_{cesat} - 15 \ (V). \tag{15}$$

In the above equation, $V_{ee}$ is the emitter voltage of the transistor 227a and $V_{cesat}$ is the saturation voltage, and the voltage $V_1$ becomes equal to $V_{ee}$ if $V_{cesat}$ can be neglected. On the other hand, if the voltage at the output terminal 228b is $V_2$ and the voltage at the connection point of the diodes $D_1$ and $D_2$ is $V_3$, voltages $V_2$ and $V_3$ are given by $$V_2 = V_3 - V_{f2} \text{ and } V_3 = V_{f1}, \tag{16}$$

where $V_{f1}$ and $V_{f2}$ are the forward voltage drops of the diodes $D_1$ and $D_2$, respectively.

As in the above, when the transistor 227a is in the on-state, forward currents flow in the diodes $D_1$ and $D_2$ and $V_{f1}$ and $V_{f2}$ are nearly equal, so that the voltage $V_2$ at the output terminal 228 is $V_2 = 0$ (V). Namely, when $\Delta V_{in} < +V_r$, the negative voltage $V_1$ is cut, and the voltage comparison circuit 204 outputs "0" signal normally.

On the other hand, when $\Delta V_{in} > +V_r$, the output of the voltage comparator assumes the L level, and the transistor 227a is turned off. As a result, the currents that flow in the resistors $R_2$ and $R_3$ become zero the voltage $V_2$ at the output terminal 228b becomes 5 V, and signal "1" is normally output.

In this manner, from the interface circuit, a logical output is obtained which normally oscillates between 0 V and 5 V.

Figure 18:
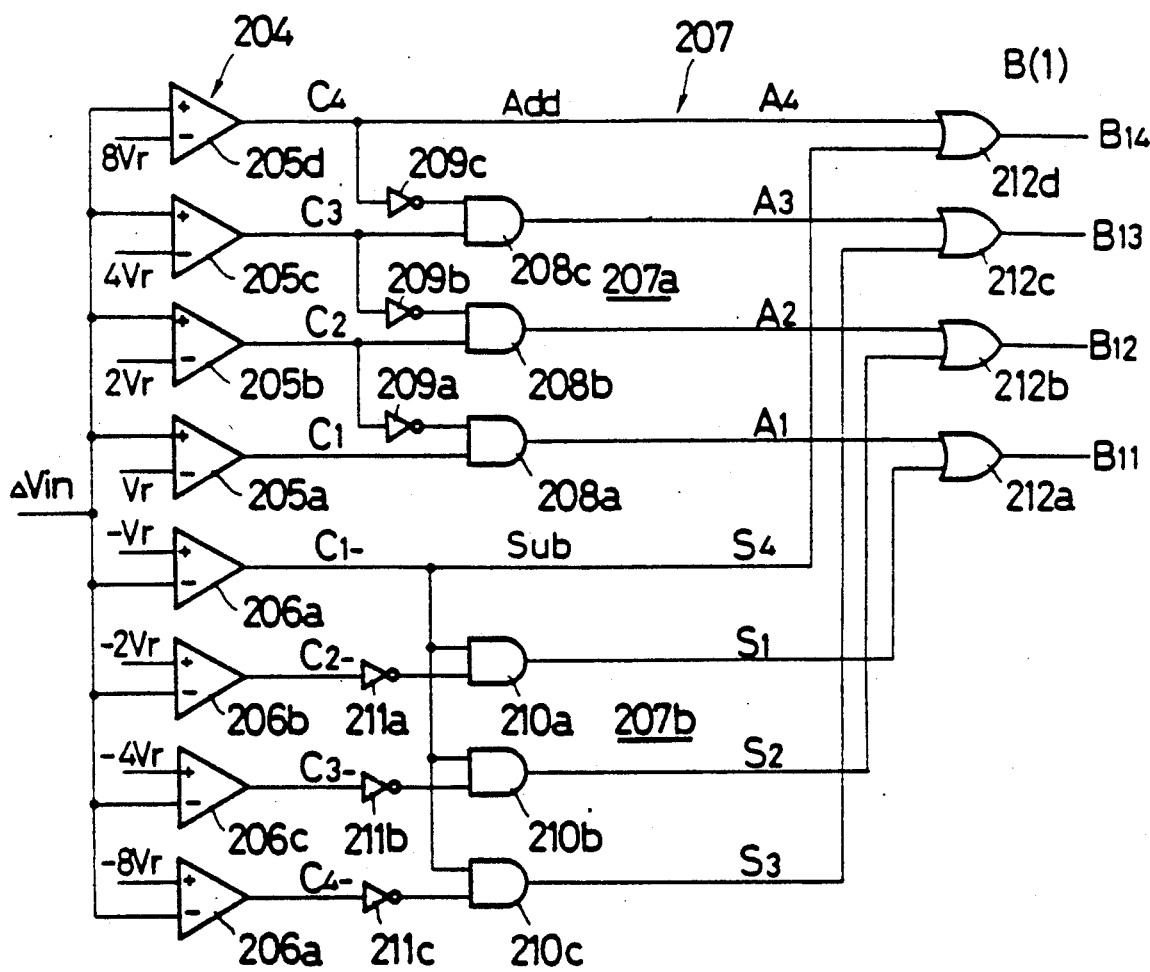
FIG. 18 is a circuit diagram for portions of the voltage comparison circuit and the addition-subtraction data set circuit in FIG. 15.

Next, referring to FIG. 18 and FIG. 19, the logical process in which the addition - subtraction data $B(1) = B_{14}$ to $B_{11}$ is output from the addition and subtraction data set circuit 207 will be described based on the output $C_1$ to $C_4$ and $C_{1-}$ to $C_{4-}$ of the voltage comparison circuit 204.

First, when the difference voltage $\Delta V_{in}$ has a positive sign, every time when it exceeds each of the reference voltages $V_r$ to $8V_r$ set for the voltage comparison circuit 204, addition data $A_1$ to $A_4$ are output to set the addition - subtraction data $B(1)$ that correspond to each bit in the following way. Namely, when the difference voltage $\Delta V_{in}$ exceeds the reference voltage $V_r$ to satisfy $V_r < \Delta V_{in} < 2V_r$, the least significant bit $B_{11}$ in the addition - subtraction data $B(1)$ becomes "1". Similarly, when the difference voltage $\Delta V_{in}$ exceeds $2V_r$, $B_{12}$ becomes "1", and when it exceeds $4V_r$, $B_{13}$ becomes "1," and when it exceeds $8V_r$, the most significant bit $B_{14}$ becomes "1".

Now, the addition data $A_1$ to $A_4$ have the following relations with the outputs $C_1$ to $C_4$ of the voltage comparators 205a to 205d.

$$A_1 = C_1 \cdot \overline{C_2},$$

$$A_2 = C_2 \cdot \overline{C_3},$$

$$A_3 = C_3 \cdot \overline{C_4},$$

$$A_4 = C_4.$$

On the other hand, if the sign of the difference voltage is negative and its value becomes smaller than each of the reference voltages $-V_r$ to $-8V_r$, subtraction data $S_1$ to $S_4$ are output to set an addition - subtraction data $B(1)$ for each bit as in the following. Namely, when the difference voltage $\Delta V_{in}$ becomes smaller than $-V_r$, (0001) must be subtracted in the full adder 213 from the digital quantity $B(4)$ so that (1111) is set for the addition - subtraction data $B(1)$. The set value (1111) corresponds to adding 1 to the least significant bit to (1110) which is the inversion of each bit of (0001).

In similar manner, when the difference voltage $\Delta V_{in}$ becomes smaller than $-2V_r$, one needs to subtract (0010) so that there is set an addition - subtraction data $B(1)$ which is (1110), when it becomes smaller than $-4V_r$, there is set (1100), and when it becomes smaller than $-8V_r$, there is set (1000). Here, the subtraction data $S_1$ to $S_4$ have the following relations with the outputs $C_{1-}$ to $C_{4-}$ of the voltage comparators 206a to 206d.

$$S_1 = C_{1-} \cdot \overline{C_{2-}},$$

$$S_2 = C_{1-} \cdot \overline{C_{3-}},$$

$$S_3 = C_{1-} \cdot \overline{C_{4-}},$$

$$S_4 = C_{4-}.$$

Figure 20:
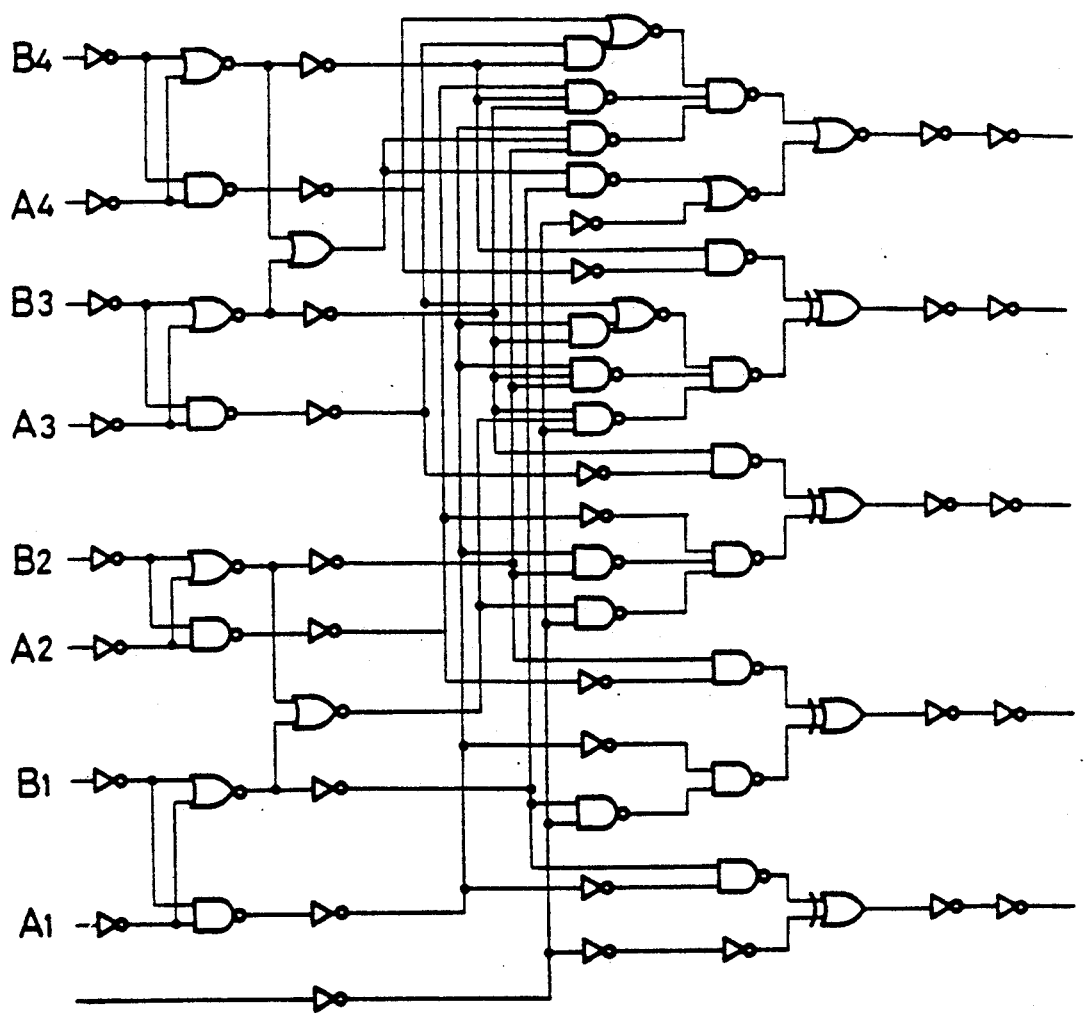
FIG. 20 is a logic diagram of the full adder in FIG. 15.
Figures 21, 22:
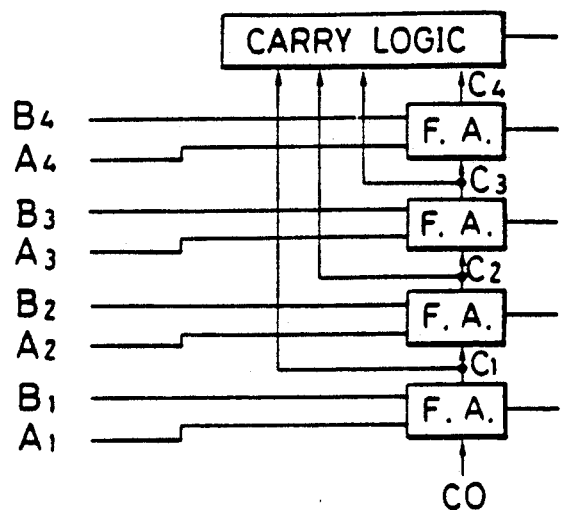
FIG. 21 is a block diagram for the full adder in FIG. 15.
FIG. 22 is the truth table for the full adder in FIG. 15.

For the 4-bit full adder 213, use is made of a disclosed apparatus so that a detailed description of its internal configuration and others will be omitted by simply giving its logic diagram in FIG. 20, block diagram in FIG. 21, and the truth table between inputs and outputs. In FIG. 20 to FIG. 22, the input signals $A_1$ to $A_4$ correspond to the digital quantity $B(4) = B_{41}$ to $B_{44}$, and the other input signals $B_1$ to $B_4$ correspond to the addition - subtraction data $B(1) = B_{11}$ to $B_{14}$.

Next, referring to the timing charts in FIG. 23, the overall operation of the A/D converter shown in FIG. 15 will be described.

Suppose that in the beginning the value of the input analog voltage $V_{in}$ that is sample held in the sample hold circuit 218 is $15V + \alpha$, and the digital quantity $B(4) = (B_{44}, B_{43}, B_{42}, B_{41})$ stored in the memory 215 is (0000). The analog volta $V_{dac}$ generated from the D/A converter 203 in proportion to the digital quantity $B(4)$ is 0 V so that a difference voltage $\Delta V_{in} = 15V + \alpha$ is output from the differential amplifier 202. The difference voltage $\Delta V_{in} = 15V + \alpha$ is compared in the voltage comparison circuit 204 simultaneously with the reference voltages $V_r$ to $8V_r$, and there is output a result $(C_4, C_3, C_2, C_1) = (1111)$ which corresponds to the difference voltage $\Delta V_{in}$.

In the addition - subtraction data set circuit 207, the addition - subtraction data $B(1) = (B_{14}, B_{13}, B_{12}, B_{11})$ is set to (1000) based on the outputs $C_4$ to $C_1$.

The full adder 213 adds the addition - subtraction data $B(1)$ which has the value (1000) to the digital quantity $B(4)$, and outputs (1000) as the data $B(2) = (B_{24}, B_{23}, B_{23}, B_{21})$. Since the buffer 214 becomes active with the timing when the clock pulse CK assumes the L level, the data B(2) is written in the memory 215 as a data B(3)=B$_{34}$, B$_{33}$, B$_{32}$, B$_{31}$).

By the writing of the data B(3), the digital quantity B(14) stored in the memory 215 becomes (1000). Because of this, the analog voltage V$_{dac}$ output from the D/A converter 203 in proportion to the digital quantity B(4) is changed to 8 V.

As a result, the difference voltage becomes $\Delta V_{in}=15V+\alpha-8V=7V+\alpha$, the output of the voltage comparison circuit 204 becomes (C$_4$, C$_3$, C$_2$, C$_1$)=(0111), and based on this output the addition - subtraction data is set to B(1)=(0100). Accordingly, the following binary operation is carried out in the full adder 213.

$$\begin{array}{rl} B(4) = & 1000 \\ +)\ B(1) = & 0100 \\ \hline B(2) = & 1100 \end{array}$$

This data B(2) becomes a data B(3) via the buffer 214, and is written in the memory 215.

In the next timing interval, an analog voltage V$_{dac}$=12 V proportional to B(4)=(1100) is generated from the D/A converter 203, and the difference voltage becomes $\Delta V_{in}=15V+\alpha-12V=3V+\alpha$. As a result, the output of the voltage comparison circuit 204 becomes (C$_4$, C$_3$, C$_2$, C$_1$)=(0011), the addition and subtraction data becomes B(1)=(0010), the data for writing becomes B(2)=(1110), and the data B(3)=(1110) is stored in the memory 215.

In this way, the digital quantity B(4) stored in the memory 215 in the beginning is successively corrected, and at the rising time of the fifth clock pulse CK, a digital quantity B(4)=(1111) which corresponds to the input analog voltage $V_{in}=15V+\alpha$ is output from the output terminal 217.

Suppose that, following the above conversion operation, an input analog voltage $V_{in}=0V-\alpha$ is sample-held at the fifth clock pulse CK. Since an analog voltage V$_{dac}$=15 V is generated from the D/A converter 203 which is proportional to the digital quantity B(4)=(1111), the difference voltage becomes $\Delta V_{in}=-15V-\alpha$. Due to this difference voltage $\Delta V_{in}$, the output of the voltage comparison circuit 204 becomes (C$_{4-}$, C$_{3-}$, C$_{2-}$, C$_{1-}$)=(1111) and the addition and subtraction data are set to B(1)=(1000). Accordingly, the following subtraction is carried out in the full adder 213.

$$\begin{array}{rl} B(4) = & 1111 \\ +)\ B(1) = & 1000 \\ \hline B(2) = & 0111 \end{array}$$

This is an operation which corresponds to a voltage drop of $15V-8V=7V$. The data B(2) becomes a data B(3) via the buffer 214, and is written in the memory 215. The full adder disregards the carry bit.

At the next timing, an analog voltage V$_{dac}$=7 V proportional to B(4)=(0111) is generated from the D/A converter 23, and the difference voltage becomes $\Delta V_{in}=-7V-\alpha$. Due to this difference voltage $\Delta V_{in}$, the output of the voltage comparison circuit 204 is set to (C$_{4-}$, C$_{3-}$, C$_{2-}$, C$_{1-}$)=(0111) and the addition and subtraction data are set to B(1)=(1100). Accordingly, the full adder 213 performs the following subtraction.

$$\begin{array}{rl} B(4) = & 0111 \\ +)\ B(1) = & 1100 \\ \hline B(2) = & 0011 \end{array}$$

This is an operation that corresponds to a voltage drop of $7V-4V=3V$. The data B(2) becomes a data B(3) via the buffer 214 and is written in the memory 215.

And, at the next timing interval, an analog voltage V$_{dac}$=3 V proportional to B(4)=(0011) is generated from the D/A converter 203, and the difference voltage becomes $\Delta V_{in}=-3V-\alpha$. As a result, the output of the voltage comparison circuit 214 becomes (C$_{4-}$, C$_{3-}$, C$_{2-}$, C$_{1-}$)=(0011), the addition and subtraction data becomes B(1)=(1110), the data for writing of the subtracted result becomes B(2)=(0001) and the data B(3)=(0001) is written in the memory 215.

As described above, along with the result of the correction operation, the absolute value of the difference voltage $\Delta V_{in}$ becomes smaller in succession as $-15$ V, $-7$ V, $-3$ V, $-1$ V, and 0 V, and at the rising of the ninth clock pulse CK, a digital quantity B(4) =(0000) that corresponds to the sample held input analog voltage $V_{in}=0V-\alpha$ is output from the output terminal 217.

In this manner, in carrying out the 4-bit A/D conversion, it needs only four clock pulses CK, realizing a high speed conversion. The conversion time can further be shortened since the number of required clock pulses CK becomes small if the width of variation in the input analog voltage V$_{in}$ becomes small, as can be seen from the table 5.

TABLE 5

| V$_{in}$ | Variation Width | Conversion time |
|---|---|---|
| 0V → 15V | +15 V | 4 CK portions |
| 15V → 0V | −15 V | 4 CK portions |
| 0V → 7V | + 7 V | 3 CK portions |
| 7V → 12V | + 5 V | 2 CK portions |
| 12V → 2V | −10 V | 2 CK portions |

Further, from the number of clock pulses CK in the above table, it will be seen that when the 4-bit A/D conversion is completed, the outputs of the voltage comparison circuit 204 become all "0" since they are $(C_4, C_3, C_2, C_1)=(0000),$ $(C_{4-}, C_{3-}, C_{2-}, C_{1-})=(0000).$ Therefore, it is possible to know the completion of the A/D conversion early by detecting the above result as a CONV signal for completion of conversion.

Figure 24:
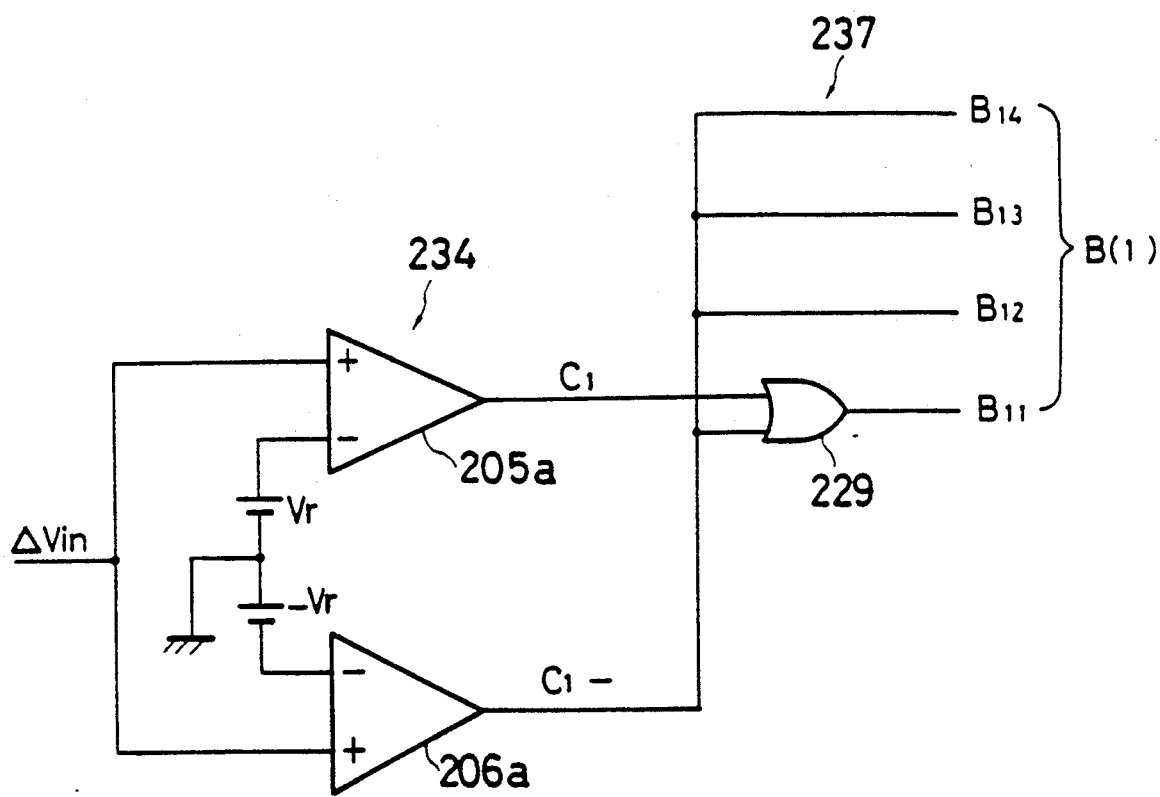
FIG. 24 is a circuit diagram showing a modification of the voltage comparison circuit and the addition-subtracting data set circuit in FIG. 15.

FIG. 24 shows a modification of the portions of the voltage comparison circuit and the addition and subtraction data set circuit in the 4-bit A/D converter. In the modification, a voltage comparison circuit 234 includes only two voltage comparators 205a and 206a for setting reference voltages +V$_r$ and −V$_r$, respectively. In addition, in an addition - subtraction data set circuit 237, one OR circuit 229 alone is provided, and two input terminals of the OR circuit 229 are connected to the output terminals of the voltage comparators 205a and 206a respectively. The least significant bit B$_{11}$ in the addition - subtraction data B(1)=(B$_{14}$, B$_{13}$, B$_{12}$, B$_{11}$) is output from the OR circuit 229. The other bits B$_{14}$, B$_{13}$, and B$_{12}$ are directly output from the voltage comparator 206a.

When the difference voltage $\Delta V_{in}$ is greater than the reference voltage $V_r$, the output $C_1$ of the voltage comparison circuit 234 becomes "1" and the addition - subtraction data is set to B(1)=(0001). On the other hand, when the difference voltage $\Delta V_{in}$ is smaller than the reference voltage $-V_r$, the output $C_{1-}$ of the voltage comparison circuit 234 becomes "1" and the addition - subtraction data is set to B(1)=(1111). Table 6 shows the above relationship.

TABLE 6

| $V_{in}$ | $B_{14}$ | $B_{13}$ | $B_{12}$ | $B_{11}$ |
|---|---|---|---|---|
| $V_r < \Delta V_{in}$ | 0 | 0 | 0 | 1 |
| $-V_r < \Delta V_{in} < V_r$ | 0 | 0 | 0 | 0 |
| $\Delta V_{in} < -V_r$ | 1 | 1 | 1 | 1 |

The addition - subtraction data B(1) in the above is added - subtracted in the full adder 213 from the digital quantity B(4) read from the memory 215, the digital quantity B(4) is successively corrected in minimum bit unit, and an A/D converted digital quantity B(4) is output from the output terminal 217.

According to the modification, there is an advantage that the configuration of the voltage comparison circuit 234 and the addition - subtraction data set circuit 237 can be made extremely simple. However, A/D conversion is carried out in terms of the correction made in the lease significant bit unit of the digital quantity B(4) read from the memory so that its conversion time is somewhat longer compared with the voltage comparison circuit 204 and the addition - subtraction data set circuit 207 shown in FIG. 15.

Figure 25:
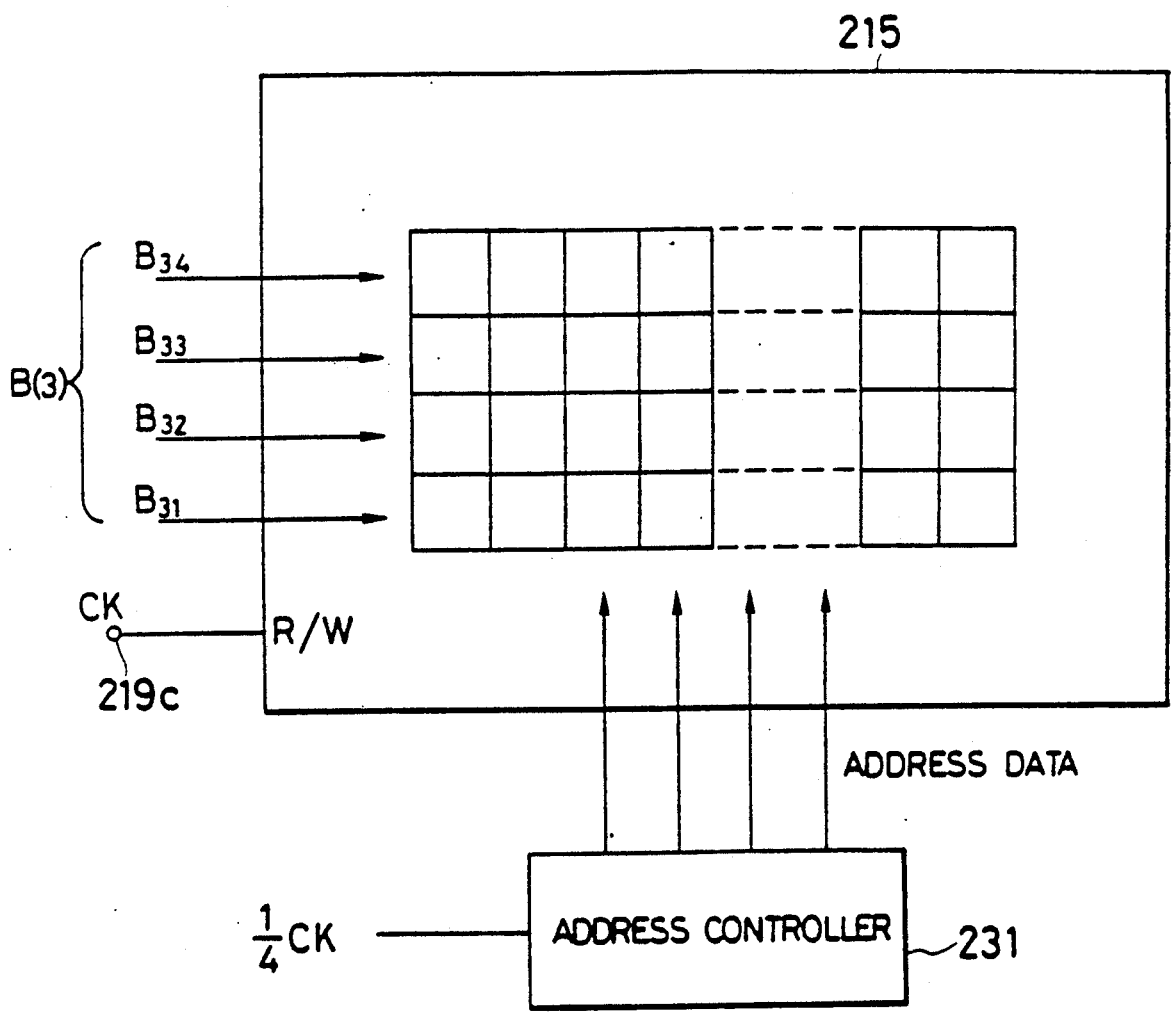
FIG. 25 is a block diagram showing a modification of the memory portion in accordance with the invention.

FIG. 25 shows a modification of the memory portion. Although in the memory 215 shown in FIG. 15 the address for storing the digital quantity is fixed, in the present modification address control is carried out by providing an address controller 231.

Figure 23:
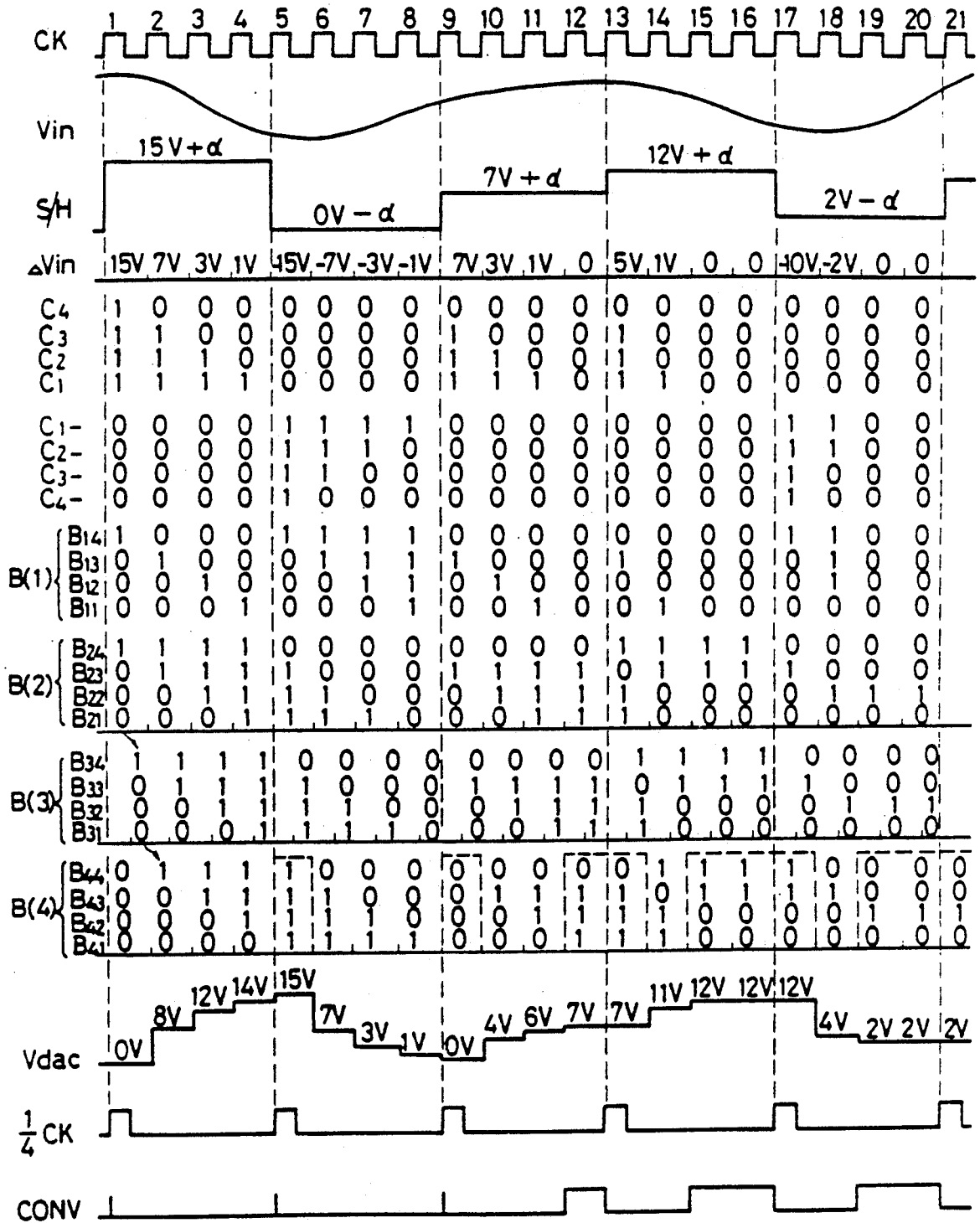
FIG. 23 is a timing chart for illustrating the operation of the full adder in FIG. 15.

When the digital quantity B(4) to be A/D converted is of 4 bits, a digital quantity B(4) can complete A/D conversion with a maximum of four clock times as shown in the timing chart in FIG. 23. Therefore the address controller 231 is driven by ($\frac{1}{4}$) CK obtained by dividing the frequency of the clock CK by four, and an address data is output to control the address of the memory 215. As a result, the memory 215 can successively store A/D converted data B(3)=($B_{34}$, $B_{33}$, $B_{32}$, $B_{31}$) in separate addresses.

Figures 26, 27:
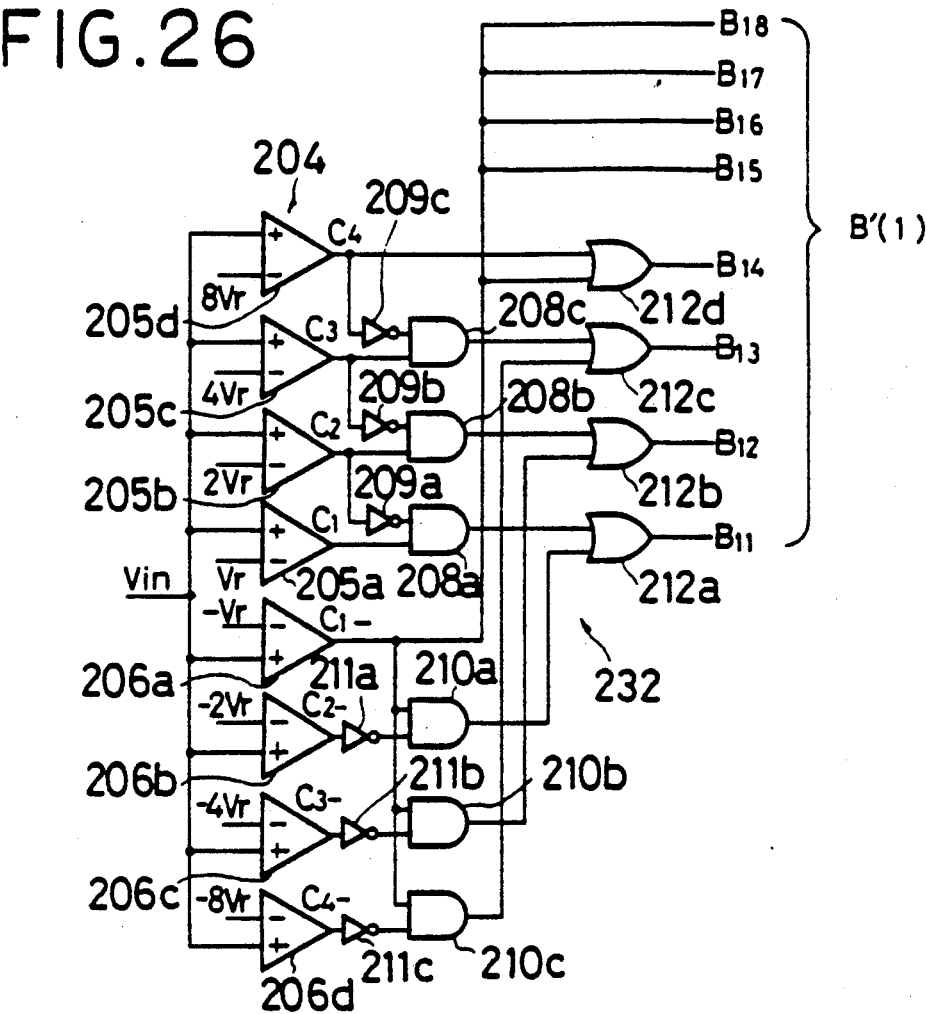
FIG. 26 is a circuit diagram showing an important part of another embodiment of the present invention.
FIG. 27 is a diagram showing the relationship between the difference voltage and the addition subtraction data for the embodiment in FIG. 26.

FIGS. 26 and 27 show an embodiment of an 8-bit A/D converter according to the present invention.

As shown in FIG. 26, a voltage comparison circuit 204 has the same system as for the 4-bit converter shown in FIG. 15. To the output terminal of a voltage comparator 206a in the voltage comparison circuit 204 for setting a reference voltage $-V_r$, there are connected output lines of upper place four bits, ($B_{18}$, $B_{17}$, $B_{16}$, $B_{15}$) of the 8-bit addition and subtraction data B'(1)=$B_{18}$, $B_{17}$, $B_{16}$, $B_{15}$, $B_{14}$, $B_{13}$, $B_{12}$, $B_{11}$), and they are expanded to 8 bits at the portion of an addition and subtraction data set circuit 232.

When the 8-bit system as described above is used, it can be realized to reduce the number of required voltage comparators in the voltage comparison circuit.

The full adder 213, buffer 214, memory 215, and latch circuit 216 in FIG. 15 are used by simply expanding them for 8 bits although they are not shown in FIG. 26. Accordingly, each data and digital quantity can be represented as follows.

B'(2)=$B_{28}$ to $B_{21}$,

B'(3)=$B_{38}$ to $B_{31}$,

B'(4)=$B_{48}$ to $B_{41}$.

FIG. 27 shows the relationship between the magnitudes of the difference voltage $\Delta V_{in}$ and the addition and subtraction data B'(1)=$B_{18}$ to $B_{11}$ set in the addition - subtraction data set circuit 232.

The addition - subtraction data B'(1)=$B_{18}$ to $B_{11}$ shown in FIG. 27 are added or subtracted in the full adder 213, from the digital quantity B'(4) read from the memory 215 to correct the digital quantity B'(4). In this case, for the upper 4 bits, addition and subtraction are carried out with the four bits (00001000) of the addition - subtraction data B'(1) as a unit.

As described in the foregoing, according to the present invention, in the voltage comparison circuit, a plurality of positive and negative reference voltages are set whose values are related to the weightings for the bits in the digital quantity. By generating an analog voltage in the D/A converter proportional to the digital quantity stored in the memory, the difference voltage between the input analog voltage and the analog voltage generated in the D/A converter is simultaneously compared with the plurality of reference voltages in the voltage comparison circuit. Based on the output from the voltage comparison circuit, a binary number with weighting that corresponds to the absolute value of the difference voltage is added to or subtracted in the full adder from the digital quantity read from the memory. The new digital quantity obtained as the result of the above operation is stored in the memory and the above process is repeated until the absolute value of the difference voltage becomes smaller than the reference voltage corresponding to the weighting for the least significant bit. As a result, A/D conversion with high accuracy can be carried out at high speed.

What is claimed is:

1. An eccentricity correction apparatus for correcting an eccentricity of an optical disc device, said apparatus comprising:

optical means for recording or reproducing information on a recording track of an optical disc using a light beam, said optical means including an optical head and driving means for positioning the light beam;

detecting means optically coupled to said optical means for converting portions of the light beam reflected from the optical disc into a position deviation signal;

tracking control means coupled to said detecting means and to said driving means for controlling said driving means in response to the position deviation signal;

first means coupled to said detecting means for selectively converting the position deviation signal to digital eccentricity correction data and for storing the eccentricity correction data;

second means coupled to said first means and to said driving means for selectively transferring the eccentricity correction data to said driving means, said second means including digital-to-analog converting means for converting the eccentricity correction data into a corresponding analog eccentricity correction signal, control signal means for receiving an externally supplied analog control signal, and combining means coupled to said digital-to-analog converting means, to said control signal means, and to said driving means for combining the analog eccentricity correction signal with the control signal to modify the position deviation signal;
reference signal means for supplying a reference signal; and
comparing means coupled to said detecting means, to said first means, and to said reference signal means for comparing the reference signal with the position deviation signal to produce a difference and for modifying the position deviation signal in accordance with the difference.

2. The eccentricity correction apparatus as claimed in claim 1 wherein the optical disc is subdivided into a plurality of sectors for data storage, and said first means includes means for storing the position deviation signal for each sector.

3. The eccentricity correction apparatus as claimed in claim 2 wherein said first means comprises means for storing the position deviation signal a plurality of times for each sector.

4. The eccentricity correction apparatus as claimed in claim 2 wherein said second means comprises means for removing an inclination of said optical means with respect to the optical disc from the eccentricity correction data.

5. The eccentricity correction apparatus as claimed in claim 1 wherein said first means comprises means for storing the eccentricity correction data corresponding to radial positions of the optical disc, and said second means comprises means for transferring the eccentricity correction data to said digital-to-analog converting means in accordance with the position of the optical means with respect to the optical disc.

6. The eccentricity correction apparatus as claimed in claim 5 wherein, in transferring the eccentricity correction data to said digital-to-analog converting means, said second means comprises means for shifting the timing of transfer in accordance with a delay of the tracking control means.

7. The eccentricity correction apparatus as claimed in claim 1 wherein said first means comprises means for selectively storing the position deviation signal as the eccentricity correction data corresponding to radial positions of the optical disc that include an inner periphery position, an intermediate position, and an outer periphery position of the optical disc.

8. The eccentricity correction apparatus as claimed in claim 1 further including second detecting means coupled to said driving means for detecting the position of said optical means and for controlling said driving means in response to the detected position of said optical means.

9. The eccentricity correction apparatus as claimed in claim 8 wherein said driving means is controlled in response to a displaced distance of said optical means detected by said second detecting means.

10. The eccentricity correction apparatus as claimed in claim 1 wherein said detecting means comprises means for detecting a magnitude and a direction of deviation of the light beam relative to the recording track of the optical disc.

11. The eccentricity correction apparatus as claimed in claim 10 wherein the reference signal means comprises means for supplying the reference signal as a plurality of reference voltages and the comparing means comprises means for comparing the position deviation signal with the plurality of reference voltages.

12. The eccentricity correction apparatus as claimed in claim 11 wherein said comparing means comprises means for comparing the plurality of reference voltages with the position deviation signal and modifying the position deviation signal until an absolute value of the position deviation signal is smaller than an absolute value of the reference voltages.

13. The eccentricity correction apparatus as claimed in claim 1 further including means for calculating a binary number that corresponds to an absolute value of the position deviation signal based on the output of the comparing means.

14. An eccentricity correction apparatus for an optical disc device having an optical head for recording or reproducing information on a recording track of an optical disc using a light beam, a tracking device for outputting a position deviation signal corresponding to the position of the light beam relative to the recording track, and a driving device coupled to the optical head and to the tracking device for positioning the optical head in response to the position deviation signal and a precise access signal, said eccentricity correction apparatus comprising:
reference signal means for supplying a reference signal;
comparing means coupled to the tracking device for comparing the position deviation signal with the reference signal to obtain a difference signal;
first converting means coupled to said comparing means for converting the difference signal into a first digital signal;
first combining means coupled to said first converting means for outputting a second digital signal;
storage means coupled to said first combining means for selectively storing the second digital signal and for selectively outputting the second digital signal to said first combining means as a feedback signal, said first combining means combining the first digital signal with the feedback signal to produce the second digital signal;
second converting means coupled to said storage means for converting the second digital signal to an analog eccentricity correction signal; and
second combining means coupled to the tracking device, to said second converting means, and to the driving device for combining the analog eccentricity correction signal with the position deviation signal from the tracking device and the precise access signal to produce a modified position deviation signal, the driving device positioning the optical head in response to the modified position deviation signal.

15. The eccentricity correction apparatus of claim 14 wherein:
the reference signal means includes means for supplying the reference signal as a plurality of reference voltages;
the comparing means includes means for comparing the position deviation signal with the plurality of reference voltages to obtain a corresponding plurality of portions of the difference signal; and
the first converting means includes means for converting the plurality of difference signal portions into the first digital signal, the first digital signal having a corresponding plurality of bits.

16. The eccentricity correction apparatus of claim 15, further including weighting means operatively coupled to said comparing means and to said first converting means for weighting each of the difference signal portions.

* * * * *